(12) United States Patent
Yumiki

(10) Patent No.: US 8,228,391 B2
(45) Date of Patent: Jul. 24, 2012

(54) IMAGE PICKUP APPARATUS AND LENS BARREL

(75) Inventor: Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 181 days.

(21) Appl. No.: 12/033,103

(22) Filed: Feb. 19, 2008

(65) Prior Publication Data

US 2008/0204565 A1 Aug. 28, 2008

(30) Foreign Application Priority Data

Feb. 22, 2007 (JP) ................................ 2007-042158

(51) Int. Cl.
*H04N 5/228* (2006.01)
(52) U.S. Cl. ............ 348/208.99; 348/222.1; 348/208.1; 348/208.4; 348/208.5
(58) Field of Classification Search .................. None
See application file for complete search history.

(56) References Cited

U.S. PATENT DOCUMENTS

| | | | |
|---|---|---|---|
| 5,099,322 A | 3/1992 | Gove | |
| 5,502,484 A | 3/1996 | Okada | |
| 5,506,912 A | 4/1996 | Nagasaki et al. | |
| 5,642,431 A * | 6/1997 | Poggio et al. | 382/118 |
| 5,712,474 A | 1/1998 | Naneda | |
| 6,148,108 A | 11/2000 | Nishikawa | |
| 6,208,377 B1 | 3/2001 | Morofuji et al. | |
| 6,778,210 B1 | 8/2004 | Sugahara et al. | |
| 7,030,911 B1 | 4/2006 | Kubo | |
| 7,333,132 B2 | 2/2008 | Shimizu et al. | |
| 7,889,237 B2 | 2/2011 | Okumura | |
| 8,036,525 B2 | 10/2011 | Lee et al. | |
| 2003/0095199 A1 | 5/2003 | Senda | |

(Continued)

FOREIGN PATENT DOCUMENTS

JP 04-211582 A 8/1992

(Continued)

OTHER PUBLICATIONS

"Panasonic Lumix DMC-FX50 & DMC-FX07," Digital Photography Review, dpreview.com, Jul. 19, 2006, downloaded from: http://www.dpreview.com/news/0607/06071903panasonicfx50.asp.

(Continued)

*Primary Examiner* — Jason Chan
*Assistant Examiner* — Yih-Sien Kao
(74) *Attorney, Agent, or Firm* — Pearne & Gordon LLP

(57) ABSTRACT

An imaging apparatus capable of preventing photographing sensitivity from being increased more than necessary, reducing image quality degradation caused by camera shake or object shake and easily photographing images in good image quality. Digital camera 1 includes image shake correcting selection 16 that corrects shake of an optical image of a photographing object formed by the imaging optical system L, digital signal amplification section 110 that amplifies an image signal with a gain set by digital signal gain setting section 111, face detection section 120 that detects a face of a fast-moving specific photographing object such as a child or pet, and motion detection section 100 that detects motion of the face of the specific photographing object based on an output of face detection section 120, wherein when a fast-moving specific photographing object such as a child or pet or the face of the specific photographing object is detected, microcomputer 3 increases the gain of a photographing sensitivity changing function compared with when no specific photographing object such as a child or pet is detected, increases ISO sensitivity, increases a shutter speed and shortens exposure time.

13 Claims, 20 Drawing Sheets

U.S. PATENT DOCUMENTS

| | | | |
|---|---|---|---|
| 2004/0207743 | A1 | 10/2004 | Nozaki et al. |
| 2004/0239775 | A1 | 12/2004 | Washisu |
| 2004/0239795 | A1 | 12/2004 | Kitajima |
| 2005/0219393 | A1* | 10/2005 | Sugimoto ............... 348/333.01 |
| 2005/0231628 | A1 | 10/2005 | Kawaguchi et al. |
| 2006/0008173 | A1* | 1/2006 | Matsugu et al. ............. 382/274 |
| 2006/0098115 | A1 | 5/2006 | Toyoda |
| 2006/0115297 | A1* | 6/2006 | Nakamaru .................... 399/163 |
| 2006/0140602 | A1 | 6/2006 | Kurata et al. |
| 2006/0165398 | A1 | 7/2006 | Imada |
| 2006/0171697 | A1* | 8/2006 | Nojima ......................... 396/103 |
| 2006/0255986 | A1* | 11/2006 | Takanezawa et al. ........... 341/67 |
| 2007/0030375 | A1 | 2/2007 | Ogasawara et al. |
| 2007/0183765 | A1 | 8/2007 | Imamura |
| 2007/0206941 | A1* | 9/2007 | Maruyama et al. ........... 396/153 |

FOREIGN PATENT DOCUMENTS

| | | |
|---|---|---|
| JP | 05-019326 A | 1/1993 |
| JP | 06-027512 A | 2/1994 |
| JP | 06-165047 A | 6/1994 |
| JP | 07-107367 A | 4/1995 |
| JP | 08-327917 A | 12/1996 |
| JP | 11-14886 A | 1/1999 |
| JP | 11-326980 A | 11/1999 |
| JP | 2000-013671 | 1/2000 |
| JP | 2001-103366 A | 4/2001 |
| JP | 2001-125173 A | 5/2001 |
| JP | 2001-245249 A | 9/2001 |
| JP | 2001-330882 A | 11/2001 |
| JP | 2002-040506 A | 2/2002 |
| JP | 2002-084453 | 3/2002 |
| JP | 2002-354402 A | 12/2002 |
| JP | 2003-107335 | 4/2003 |
| JP | 2003-107555 | 4/2003 |
| JP | 2003-156680 A | 5/2003 |
| JP | 2003-222790 A | 8/2003 |
| JP | 2003-344891 A | 12/2003 |
| JP | 2004-120576 | 4/2004 |
| JP | 2004-320287 A | 11/2004 |
| JP | 2005-184246 A | 7/2005 |
| JP | 2005-318554 A | 11/2005 |
| JP | 2005-347873 | 12/2005 |
| JP | 2006-050149 A | 2/2006 |
| JP | 2006-157428 | 6/2006 |
| JP | 2006-186481 A | 7/2006 |
| JP | 2006-208691 A | 8/2006 |
| JP | 2006-270751 A | 10/2006 |
| JP | 2007-013272 A | 1/2007 |
| JP | 2007-041570 A | 2/2007 |
| JP | 2007-206583 A | 8/2007 |
| JP | 2008-107608 A | 5/2008 |

OTHER PUBLICATIONS

"Panasonic Lumix DMC-FX07 Review," PhotographyBLOG, Nov. 20, 2006, downloaded from: http://www.photographyblog.com/reviews_panasonic_lumix_dmc_fx07.php.

Hissink, Dennis, "Panasonic Lumix DMC FX07," LetsGoDigital, Jul. 19, 2006, downloaded from: http://www.letsgodigital.org/en/9104/panasonic_lumix_fx07/.

"Panasonic, Operating Instructions, Digital Camera Model No. DMC-FX07, DMX-FX3," Aug. 2006, Matsushita Electric Industrial Co., Ltd., Secaucus, NJ, U.S.A. pp. 72-73.

Yumiki, Naoto, "Statement of Inventor's Knowledge of Products Previously Sold in the United States Featuring 'Intelligent ISO Control'," Nov. 2008.

International Search Report for Appl. No. PCT/JP2007/052979 dated May 22, 2007.

International Search Report for Appl No. PCT/JP2008/001831 dated Oct. 14, 2008.

Extended European Search Report for Appl. No. PCT/JP2007/052979 dated Feb. 9, 2011.

US Office Action for U.S. Appl. No. 12/033,087 dated Oct. 20, 2011.

Japanese Office Action for PCT/JP2007-042158 dated Sep. 6, 2011.

Japanese Office action dated Jul. 5, 2011.

Office Action for U.S. Appl. No. 11/911,927 dated Nov. 23, 2011.

Office action dated Jan. 30, 2012 for U.S. Appl. No. 12/667,731.

Office action in a corresponding U.S. Appl. No. 12/033,087 dated Apr. 6, 2012.

Japanese Office action for JP2008-501708 dated Apr. 24, 2012.

* cited by examiner

IMAGE PICKUP APPARATUS AND LENS BARREL

CROSS REFERENCE TO RELATED APPLICATIONS

The disclosure of Japanese Patent Application No. 2007-042158, filed on Feb. 22, 2007, including the specification, drawings and abstract, is incorporated herein by reference in its entirety.

BACKGROUND OF THE INVENTION

1. Field of the Invention

The present invention relates to an imaging apparatus and lens barrel. More particularly, the present invention relates to an imaging apparatus and lens barrel having a camera shake correcting function and a photographing sensitivity changing function.

2. Description of Related Art

Imaging apparatuses such as digital still cameras and digital video cameras that convert an optical image of a photographing object to an electrical image signal and output the image signal (hereinafter simply referred to as "digital cameras"), have become popular. With reductions in size and weight and escalation in the magnification of optical zooming in recent years in particular, digital cameras have become convenient for photographers.

However, accompanying reductions in size and weight and escalation in the magnification of optical zooming of digital cameras, a blur may occur in photographed images and may cause image quality degradation.

Patent Document 1 (Japanese Patent Application Laid-Open No. 2000-13671) discloses a digital camera with a blur correcting optical system that reduces the influence of image shake upon the image when a photograph is taken. The digital camera disclosed in Patent Document 1 moves the correction lens up, down, left and right in directions perpendicular to the optical axis, depending on image shake of when a photograph is taken, and corrects image distortion. By this means, it is possible to take a photograph with reduced image shake using a smaller-sized and lighter-weighted digital camera. Furthermore, the digital camera disclosed in Patent Document 1 does not have to use a flash lamp to emit light upon taking a photograph to prevent image shake, so that it is possible to take a photograph under conditions producing similar atmosphere to natural colors.

On the other hand, among causes for degrading image quality of photographed images is object shake caused by the motion of the photographing object, in addition to camera shake caused by vibration such as caused by a shaking hand, added to the camera. Object shake can be prevented by making exposure time shorter and taking a photograph at a high shutter speed. Shutter speed can be made faster by, for example, increasing photographing sensitivity or by flashing flash lamp. As for optical image shake of the photographing object in the imaging plane, shake caused by vibration applied to the camera will be referred to as "camera shake" and shake caused by the motion of the photographing object will be referred to as "object shake." Camera shake and object shake will be collectively referred to as "image shake" with respect to the imaging plane.

Patent Document 2 (Japanese Patent Application Laid-Open No. 2006-157428; US 2006/0115297 A1) discloses an apparatus with a motion prediction section for predicting the motion of the photographing object and changing photographing conditions such as shutter speed when the photographing object is likely to move, and an method applicable with the apparatus.

Patent Document 3 (Japanese Patent Application Laid-Open No. 2003-107335; U.S. Pat. No. 7,298,412B2 etc.) discloses a technique of detecting the face, eyes, nose and mouth of a person in image data, using part of the detected face of the person as the automatic focus area (herein after "AF area") and performing automatic focus control.

Generally, when photographing sensitivity is increased, the output signal from the imaging sensor is amplified, and, consequently, noise generated from the imaging sensor is also amplified. Therefore, an image taken in high sensitivity contains a large amount of noise. Increasing photographing sensitivity more than necessary may thus result in image quality degradation. It is therefore desirable to increase photographing sensitivity when camera shake still occurs due to insufficient ambient brightness after correction by the correcting optical system or when a fast-moving photographing object is photographed.

However, with such a conventional imaging apparatus, it is difficult for photographers to identify what level of moving speed of the photographing object causes object shake. Therefore, cases often occur where even though it is possible to take a photograph without object the photographer observing the motion of the photographing object misjudges that object shake will occur. As a result, there is a problem that the photographers change photographing sensitivity to high sensitivity and take a photograph containing a large amount of noise. Furthermore, there is a problem that photographers need to change photographing sensitivity immediately before taking a photograph and might miss the chance to take a photograph.

That is, a general photographer cannot identify what level of moving speed of the photographing object will or will not cause object shake. In other words, using the camera shake correcting function may result in taking a photograph with object shake when the photographing object is moving fast, and increasing ISO sensitivity may result in taking a photograph with a large amount of noise when the photographing object is moving slowly. Therefore, taking photographs in good quality is not possible.

Furthermore, based on an understanding that children are generally likely to move in front of a camera, object shake is more likely to occur, but there is a problem that such object shake cannot be judged beforehand.

Furthermore, although the digital camera having a blur correcting optical system disclosed in Patent Document 1 can reduce image quality degradation due to camera shake, there is no proposal of easing image quality degradation caused by object shake.

Furthermore, since the digital camera disclosed in Patent Document 2 is only directed to predicting the motion of the photographing object and is not directed to deciding what level of moving speed of the photographing object will or will not cause object shake, it is not always possible to take a photograph at an optimal shutter speed matching the speed of the photographing object.

SUMMARY OF THE INVENTION

It is therefore an object of the present invention to provide an imaging apparatus and lens barrel that reduce image quality degradation due to camera shake and object shake by preventing photographing sensitivity from being increased more than necessary and enabling images of good quality to be photographed.

According to an aspect of the present invention, an imaging apparatus employs a configuration having: an imaging optical system that forms an optical image of a photographing object; an imaging sensor that receives the formed optical image, converts the optical image to an electrical image signal and outputs the image signal; a specific photographing object detection section that detects a specific photographing object based on the image signal; and an a control section that takes, when the specific photographing object is detected, a photograph at a higher amplification factor of the image signal and in a shorter exposure time.

According to another aspect of the present invention, an imaging apparatus body is used in combination with a lens barrel mounted with a camera shake correcting section that corrects shake of an optical image caused by motion of the imaging apparatus, the imaging apparatus body having: an imaging sensor that receives a formed optical image, converts the optical image to an electrical image signal and outputs the image signal; a specific photographing object detection section that detects a specific photographing object based on the image signal; and a control section that takes, when the specific photographing object is detected, a photograph at a high amplification factor of the image signal and in a short exposure time.

According to yet another aspect of the present invention, a lens barrel is used in combination with an imaging apparatus body, the imaging apparatus body having: an imaging optical system that forms an optical image of a photographing object; an imaging sensor that receives the formed optical image, converts the optical image to an electrical image signal and outputs the image signal; a specific photographing object detection section that detects a specific photographing object based on the image signal; and a control section that takes, when the specific photographing object is detected, a photograph at a higher amplification factor of the image signal and in a shorter exposure time, the lens barrel having: a camera shake correcting section that corrects shake of the optical image caused by motion of the imaging apparatus body; and an interface between the camera shake correcting section and the control section of the imaging apparatus body.

DETAILED DESCRIPTION OF THE PREFERRED EMBODIMENT

Embodiments of the present invention will be explained below in detail with reference to the accompanying drawings.

(Embodiment 1)

Figure 1:
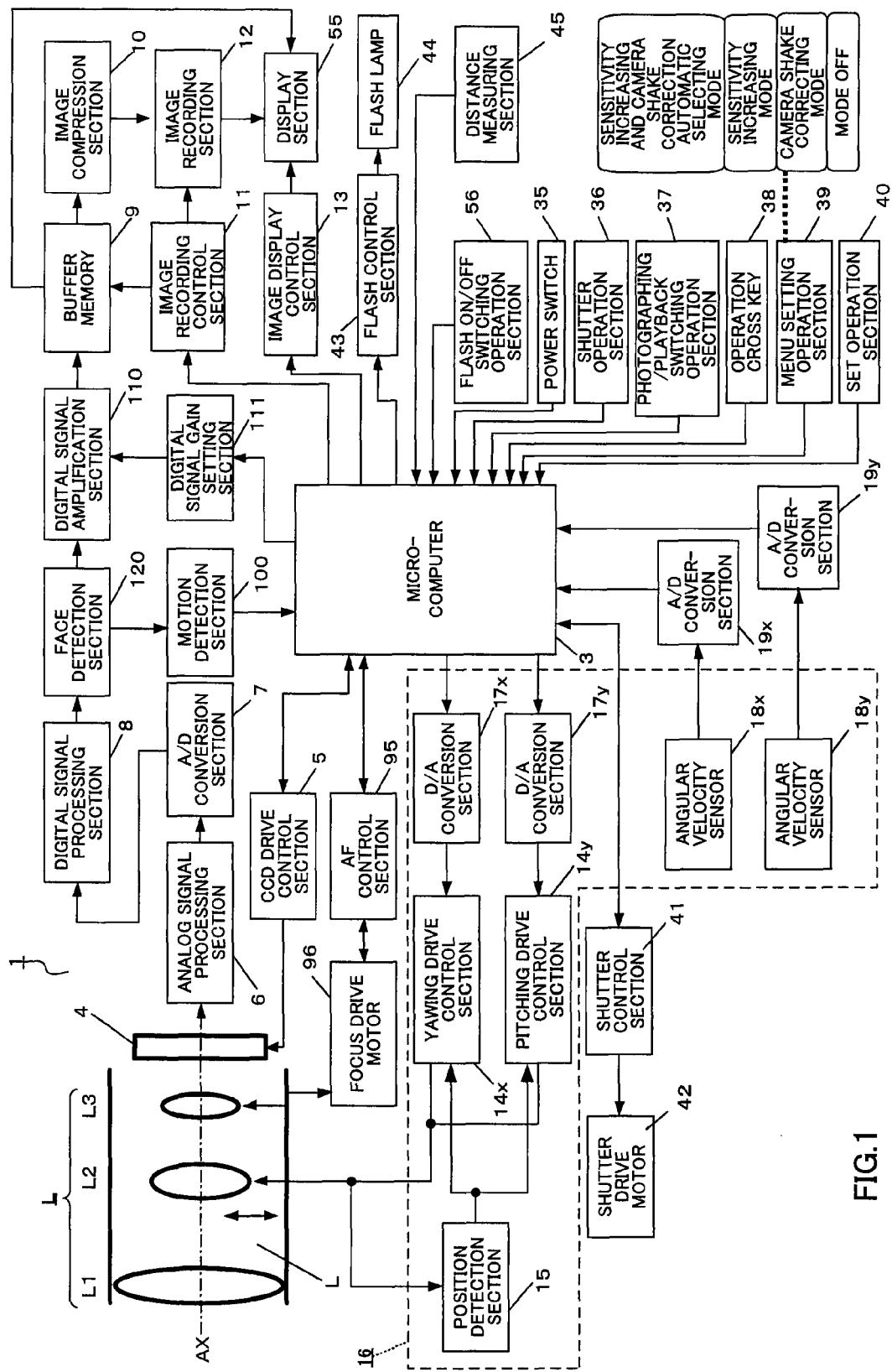
FIG. 1 is a block diagram showing a configuration of an imaging apparatus according to Embodiment 1 of the present invention.
Figure 2A:
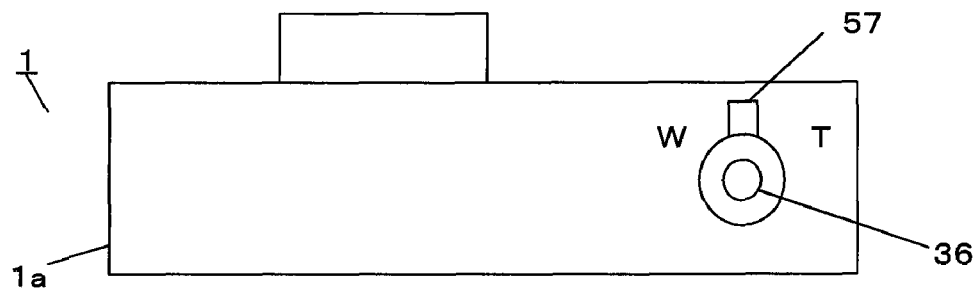
FIG. 2 shows a schematic configuration of an imaging apparatus according to Embodiment 1.
Figure 2B:
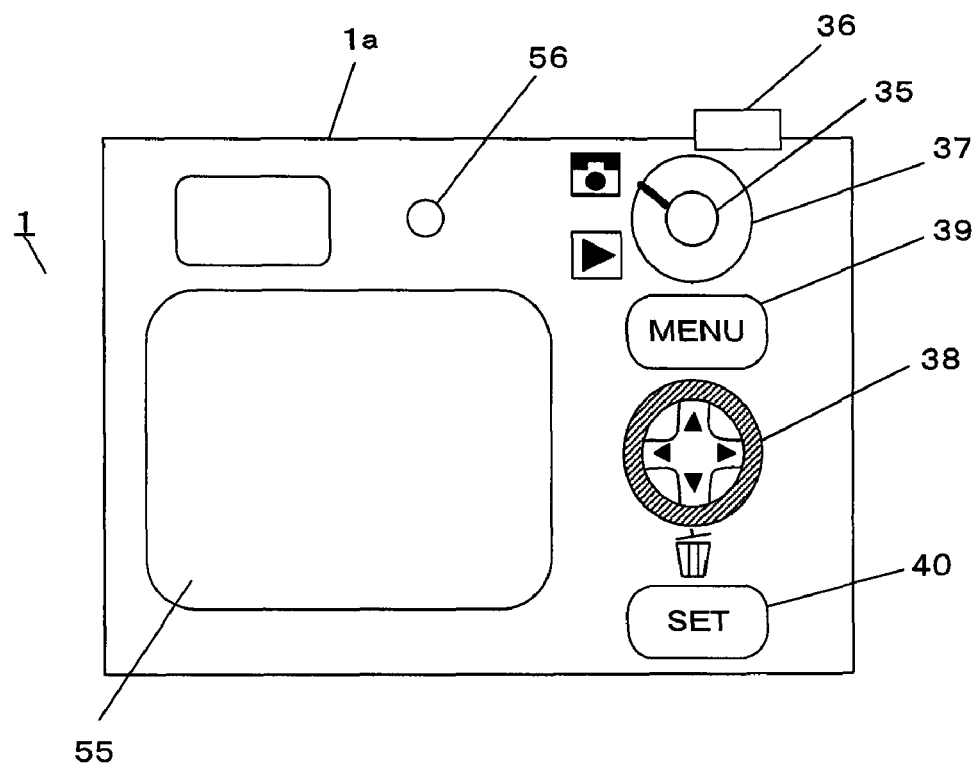

FIG. 1 is a block diagram showing the configuration of an imaging apparatus according to an embodiment of the present invention. FIG. 2 illustrates schematic configuration of the imaging apparatus according to the present embodiment, where FIG. 2A shows a top view and FIG. 2B shows a rear view. The present embodiment is an example of a digital camera application with a camera shake correcting function and a photographing sensitivity changing function. In the following explanation, the moving speed of the photographing object (also referred to as "the object speed") is the moving speed of an optical image of the photographing object in the imaging plane, caused by one of or both of camera shake and object shake. Furthermore, the moving speed of the face of the photographing object is the moving speed of the face of an optical image of the photographing object in the imaging plane caused by one of or both of camera shake and object shake. Furthermore, the moving speed of the photographing object and the moving speed of the face of the photographing object will be also collectively referred to as the speed of the object speed.

In FIG. 1, digital camera 1 employs a configuration having an the imaging optical system L, microcomputer 3, imaging sensor 4, CCD (Charge Coupled Device) drive control section 5, analog signal processing section 6, A/D conversion section 7, digital signal processing section 8, buffer memory 9, image compression section 10, image record control section 11, image recording section 12, image display control section 13, camera shake correcting section 16, angular velocity sensor 18, display section 55, shutter control section 41, shutter drive motor 42, flash control section 43, flash lamp 44, AF control section 95, focus drive motor 96, motion detecting section 100, digital signal amplification section 110 and digital signal gain setting section 111.

The imaging optical system L is an optical system including three lens groups L1, L2 and L3. The first lens group L1 and the second lens group L2 perform zooming by moving in the direction of the optical axis. The second lens group L2 is a correction lens group that decentralizes the optical axis and corrects the motion of an image by moving in the plane perpendicular to the optical axis. The third lens group L3 performs focusing by moving in the direction of the optical axis. The imaging optical system L is not limited to the above-described optical system configuration.

When mechanical vibration or shake by the photographer is added to digital camera 1, a gap is created between the optical axis of light radiated from the photographing object to the lens and the optical axis of the lens, and, as a consequence, a blurred image is created. Therefore, digital camera 1 has camera shake correcting section 16 and camera shake correcting mechanism 20 to prevent a blurred image from being created. Camera shake correcting section 16 and camera shake correcting mechanism 20 are intended to reduce optical image shake caused by the photographer's shake and vibration added to the camera, for example.

Imaging sensor 4 is, for example, a CCD sensor that converts the optical image formed by the imaging optical system L to electrical signal. Imaging sensor 4 is driven and controlled by CCD drive control section 5. Imaging sensor 4 may be a CMOS (Complementary Metal Oxide Semiconductor) sensor.

Microcomputer 3 controls the whole of digital camera 1 and also performs photographing control processing of controlling the camera shake correcting function and the photographing sensitivity changing function in accordance with the motion of the photographing object. If the object speed is lower than a threshold, microcomputer 3 controls the camera shake correcting function and starts camera shake correction. If the object speed is equal to or higher than the threshold, microcomputer 3 increases the gain for the photographing sensitivity changing function and makes exposure time short compared to the case where the object speed is lower than the threshold, and takes a plurality of images continuously applying different exposure conditions. Details of the photographing control processing will be described later according to the flowchart in FIG. 6. Furthermore, microcomputer 3 can receive signals from power switch 35, shutter operation section 36, photographing/playback switching operation section 37, operation cross key 38, MENU setting operation section 39 and SET operation section 40. Microcomputer 3 is an example of the control section of the present invention.

In FIG. 2, casing 1a of digital camera 1 is held by the photographer when the photographing object is photographed. Display section 55, power switch 35, photographing/playback switching operation section 37, operation cross key 38, MENU setting operation section 39 and SET operation section 40 are provided in the back of casing 1a.

Power switch 35 is an operation unit for turning on and off power to digital camera 1. Photographing/playback switching operation section 37 is an operation unit for switching between photographing mode and playback mode and allows the photographer to switch between modes by turning a lever. MENU setting operation section 39 is an operation unit for setting various operations of digital camera 1. Operation cross key 38 is an operation unit where the photographer presses the upper, lower, left and right parts and selects desired menu from various menu screens displayed on display section 55. SET operation section 40 is an operation unit for making various menu displays return to the previous display.

In FIG. 2A, shutter operation section 36 and zoom operation section 57 are provided on the top surface of casing 1a. Zoom operation section 57 is provided around shutter operation section 36 and is coaxially rotatable with shutter operation section 36. When the photographer operates photographing/playback switching operation section 37 to switch the mode to photographing mode and turns zoom operation section 57 clockwise, the lens group moves toward the telephoto side, and, when the photographer turns zoom operation section 57 counterclockwise, the lens group moves toward the wide-angle side.

Shutter operation section 36 is, for example, a release button operated by the photographer upon taking a photograph. When shutter operation section 36 is operated, a timing signal is outputted to microcomputer 3. Shutter operation section 36 is a two-stage pushdown switch allowing half-press operation and full-press operation, and, when the photographer performs the half-press operation, shutter operation section 36 starts motion detection, photometric processing and distance measuring processing for the photographing object, which will be described later. When the photographer performs the full-press operation, a timing signal is outputted. Shutter control section 41 drives shutter drive motor 42 according to a control signal outputted from microcomputer 3 which having received the timing signal, and operates the shutter.

Returning to FIG. 1 again, the explanation of the configuration of digital camera 1 will be continued. In FIG. 1, flash control section 43 controls the operation of flash lamp 44. Microcomputer 3, having received the timing signal through the operation of shutter operation section 36, outputs a control signal to flash control section 43. According to this control signal, flash control section 43 makes flash lamp 44 emit light. Flash lamp 44 is controlled according to the amount of light received by imaging sensor 4. That is, if the output of the image signal from imaging sensor 4 is equal to or below a predetermined value, flash control section 43 makes flash lamp 44 work with the shutter operation and emit light automatically. By contrast, if the output of the image signal is equal to or above the predetermined value, flash control section 43 controls flash lamp 44 not to emit light.

Flash ON/OFF operation section 56 is provided to control the operation of flash lamp 44 irrespective of the output of imaging sensor 4 above. That is, flash control section 43 makes flash lamp 44 emit light when flash ON/OFF operation section 56 is turned on, and does not make flash lamp 44 emit light when flash ON/OFF operation section 56 is turned off.

The image signal outputted from imaging sensor 4 is sent from analog signal processing section 6 to A/D conversion section 7, digital signal processing section 8, digital signal amplification section 110, buffer memory 9 and image compression section 10 in sequence and processed. Analog signal processing section 6 applies analog signal processing such as gamma processing, to the image signal outputted from imaging sensor 4. A/D conversion section 7 converts the analog signal outputted from analog signal processing section 6 to a digital signal. Digital signal processing section 8 applies digital signal processing such as noise cancellation and contour emphasis to the image signal converted to the digital signal by A/D conversion section 7 and outputs the signal to motion detecting section 100 and digital signal amplification section 110. Buffer memory 9 is a RAM (Random Access Memory) and stores the image signal on a temporary basis.

Digital signal gain setting section 111 sets the amplification gain for the image signal after digital signal processing. Digital signal amplification section 110 amplifies the image signal using the set amplification gain and outputs the signal to buffer memory 9. The setting of amplification gain is equivalent to setting photographing sensitivity. With the present embodiment, photographing sensitivity is expressed in values equivalent to ISO sensitivity and can be set equivalent to photographing sensitivity of ISO80, 100, 200, 400, 800 and 1600, for example. Here, photographing sensitivity that can be set is not limited to these. Furthermore, photographing sensitivity may be expressed in values other than ISO sensitivity equivalents.

Furthermore, the processing of amplifying an image signal is not necessarily performed in digital signal amplification section 110 and may be performed on an analog signal in analog signal processing section 6. Furthermore, the amplification processing may be performed in imaging sensor 4.

The image signal stored in buffer memory 9 is sent from image compression section 10 to image recording section 12 in sequence and processed. The image signal stored in buffer memory 9 is read out according to a command from image record control section 11 and transmitted to image compression section 10. Data of the image signal transmitted to image compression section 10 is compressed to image signal according to a command from image record control section 11. Through this compression processing, the image signal is reduced to a smaller data size than source data. For example, the JPEG (Joint Photographic Experts Group) scheme is used as the compression method. After that, the compressed image signal is recorded in image recording section 12 by image record control section 11.

Image recording section 12 is, for example, a built-in memory and/or a detachable, removable memory that records the image signal in association with predetermined information to be recorded, based on the command of image record control section 11. The predetermined information to be recorded together with the image signal includes the date and time the image is taken, focal length information, shutter speed information, F-number information and photographing mode information. The predetermined information is given, for example, in the Exif (registered trademark) format or similar formats to the Exif format.

Display section 55 displays an image signal recorded in image recording section 12 or buffer memory 9 in visible image, according to a command from image display control section 13. Here, the display mode of display section 55 includes a display mode in which only image signals are displayed in visible image, and a display mode in which image signals and information upon photographing are displayed in visible images.

AF control section 95 adjusts focus by driving the third lens group L3 through focus drive motor 96 in the optical axis AX direction. Face detection section 120 performs face detection processing on a plurality of photographing objects, and microcomputer 3 performs automatic focusing processing by setting AF area upon the detected faces of the photographing objects. The AF areas are not limited to the faces of the photographing objects and may be set upon eyes, nose, mouth and so on. Furthermore, the sex and age of the photographing object, or whether or not the photographing object is an animal, is decided by extracting features of the face.

AF control section 95 detects the state of focus in each AF area and calculates an optimum focusing position for the principal photographing object.

Figure 7:
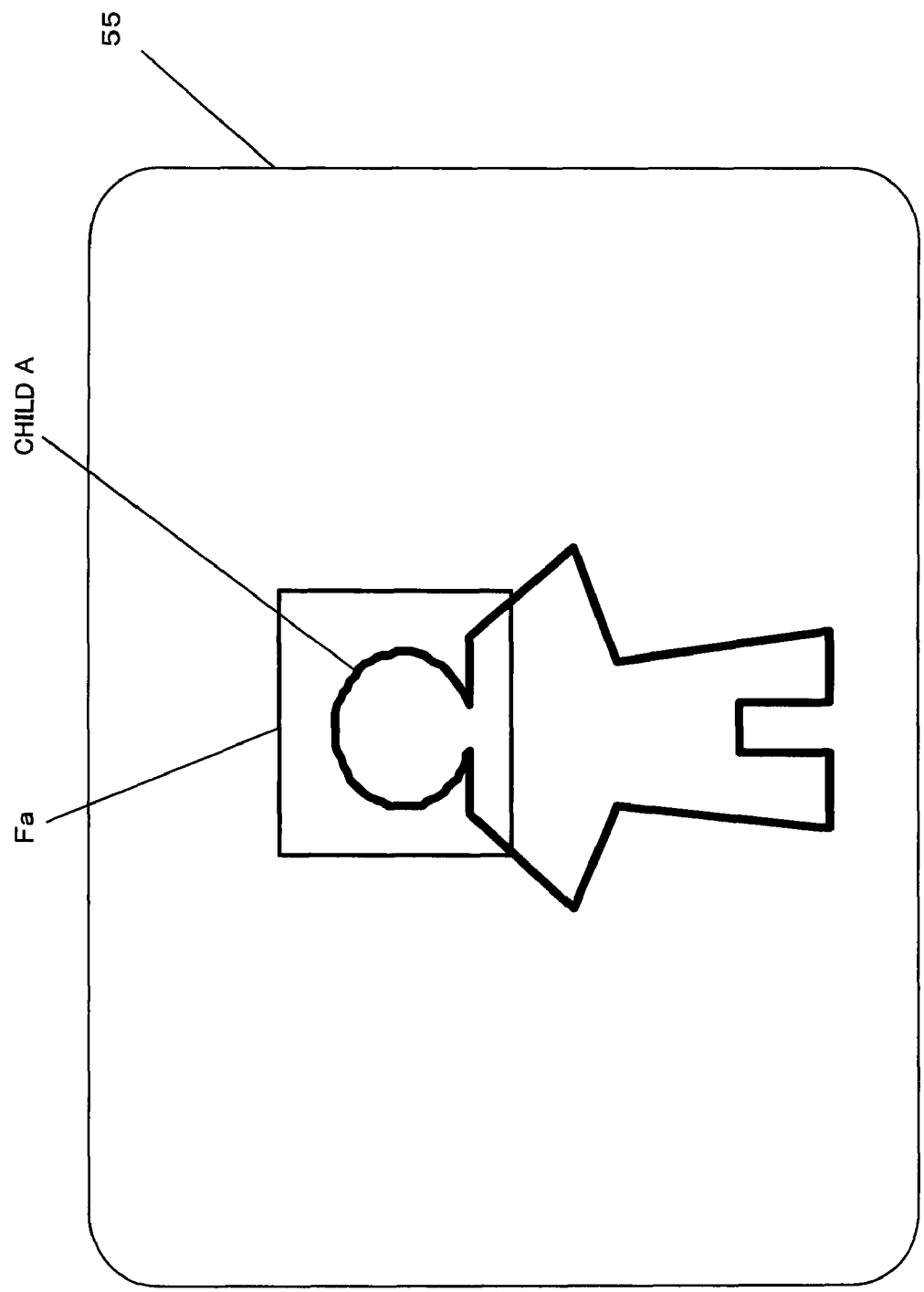
FIG. 7 is an example of a AF area set in the imaging apparatus according to Embodiment 1.

FIG. 7 shows an example of a AF area set by digital camera 1. In FIG. 7, AF area Fa is set with a solid line in a predetermined position in the photographing screen where the face of photographing object (child A) is detected.

Focus drive motor 96 moves the third lens group L3, which is a focus lens, in the optical axis direction, and determines the position of the third lens group L3 where the contrast value in AF area Fa becomes a maximum. The contrast value is obtained by calculating with microcomputer 3 changes in light and dark from the image signal corresponding to the AF area Fa. AF control section 95 calculates an optimum focusing position for the principal photographing object from, example, the magnitude of the contrast value of AF area Fa and weight based on the position of the AF area Fa in the photographing screen. Therefore, the photographer can check in which part on the photographing screen focus is set, from the displayed AF area Fa.

Motion detecting section 100 detects, on a per frame basis, a vector (hereinafter "motion vector") showing the amount of position shift in the horizontal and vertical directions of the image between frames, based on the image signal converted to a digital signal in the AF area Fa. Hereinafter, the details of motion detecting section 100 will be explained.

Figure 3:
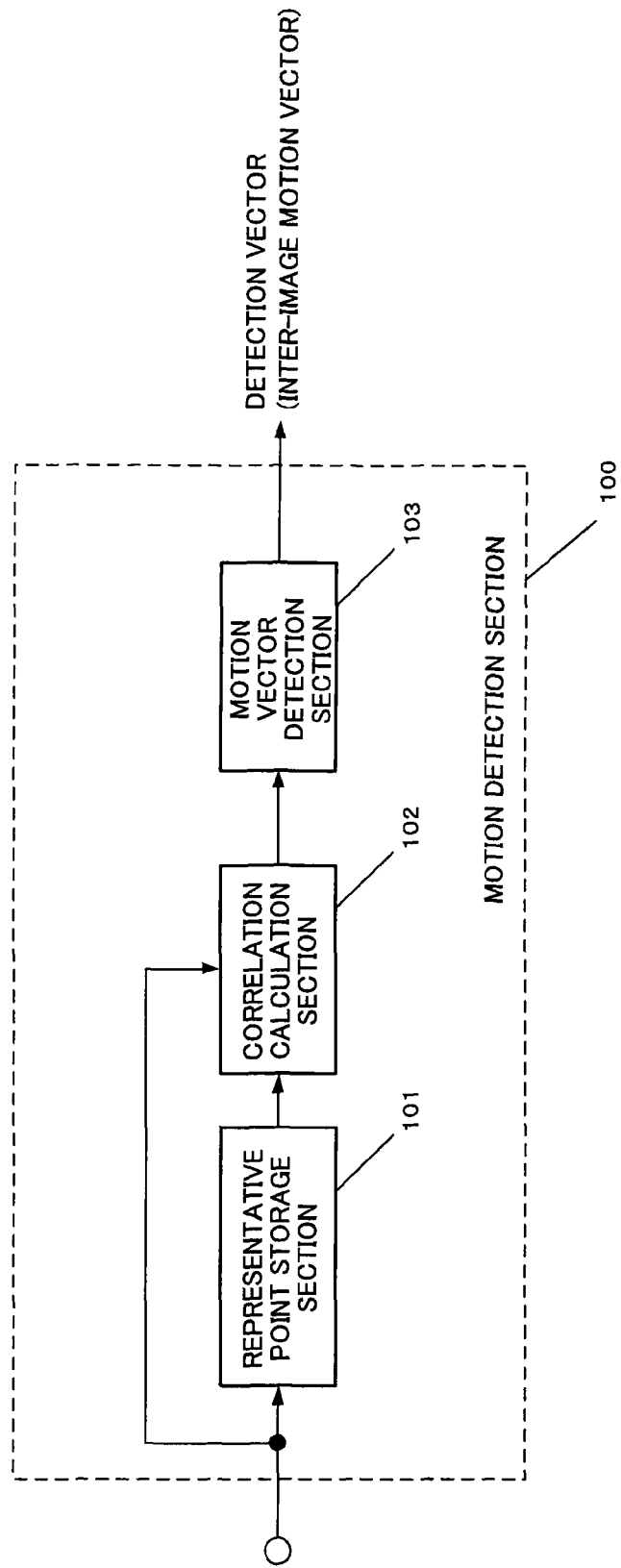
FIG. 3 is a block diagram showing an example of a configuration of a motion detecting section of the imaging apparatus according to Embodiment 1.

FIG. 3 is a block diagram showing an example of the configuration of above-described motion detecting section 100. In FIG. 3, motion detecting section 100 employs a configuration including representative point memory 101, correlation calculation section 102 and motion vector detecting section 103.

Representative point memory 101 divides the image signal of the current frame inputted via A/D conversion section 7 and digital signal processing section 8 into a plurality of segments, and stores image signals corresponding to the specific representative points included in each segment as representative point signals. Alternatively, representative point memory 101 selects part or a plurality of segments of the image signal of the current frame and stores image signals corresponding to specific representative points included in the respective segments as representative point signals. Furthermore, representative point memory 101 reads out the representative point signals in one frame earlier than the current frame that is already stored, and outputs the signals to correlation calculation section 102. Correlation calculation section 102 calculates the correlations between the representative signal points of one frame earlier and the representative signal points of the current frame, and determines the differences between the representative signal points. The calculation result is outputted to motion vector detecting section 103.

Motion vector detecting section 103 detects the motion vector of the image between the previous frame and the current frame on a per pixel basis, from the calculation result by correlation calculation section 102. The motion vector is then outputted to microcomputer 3. Microcomputer 3 adjusts the gain and phase of the motion vector and calculates the moving direction and speed of the photographing object in the image signal per unit time.

The processing of detecting the motion of the photographing object is started by, for example, the half-press operation of shutter operation section 36 by the photographer. The start of the processing may also be synchronized with the operation of turning on power switch 35 and switching to photographing mode by operating photographing/playback switching operation section 37 by the photographer.

Next, the configuration of camera shake correcting section 16 which implements the camera shake correcting function will be explained. Camera shake correcting section 16 includes position detecting section 15, yawing drive control section 14x, pitching drive control section 14y, D/A conversion sections 17x and 17y, angular velocity sensors 18x and 18y and A/D conversion sections 19x and 19y.

Yawing drive control section 14x and pitching drive control section 14y drive the correction lens group L2 in two directions perpendicular to the optical axis AX of the imaging optical system L. Position detecting section 15 detects the position of the correction lens group L2. Above-described position detecting section 15, yawing drive control section 14x and pitching drive control section 14y form a feedback control loop for driving and controlling the correction lens group L2.

Angular velocity sensors 18x and 18y are sensors for detecting the motion of digital camera 1 including the imaging optical system L. Angular velocity sensors 18x and 18y output positive and negative angular velocity signals depending on the direction the digital camera moves, based on the output in a state where digital camera 1 is still. In the present embodiment, two angular velocity sensors are provided for detecting the two directions of the yawing direction and the pitching direction.

The outputted angular velocity signal is converted into a digital signal by A/D conversion sections 19x and 19y via filtering processing and amplification processing, and the result is provided to microcomputer 3. Microcomputer 3 applies filtering, integration processing, phase compensation, gain adjustment and clipping processing to the angular velocity signal in sequence, calculates the amount of drive control of the lens group L2 required for camera shake correction and outputs the calculation result as a control signal. Such a control signal is outputted to yawing drive control section 14x and pitching drive control section 14y through D/A conversion sections 17x and 17y.

Yawing drive control section 14x and pitching drive control section 14y drive the correction lens group L2 by a predetermined amount of drive, according to the control signal, so that it is possible to correct camera shake and reduce image quality degradation.

Figure 4:
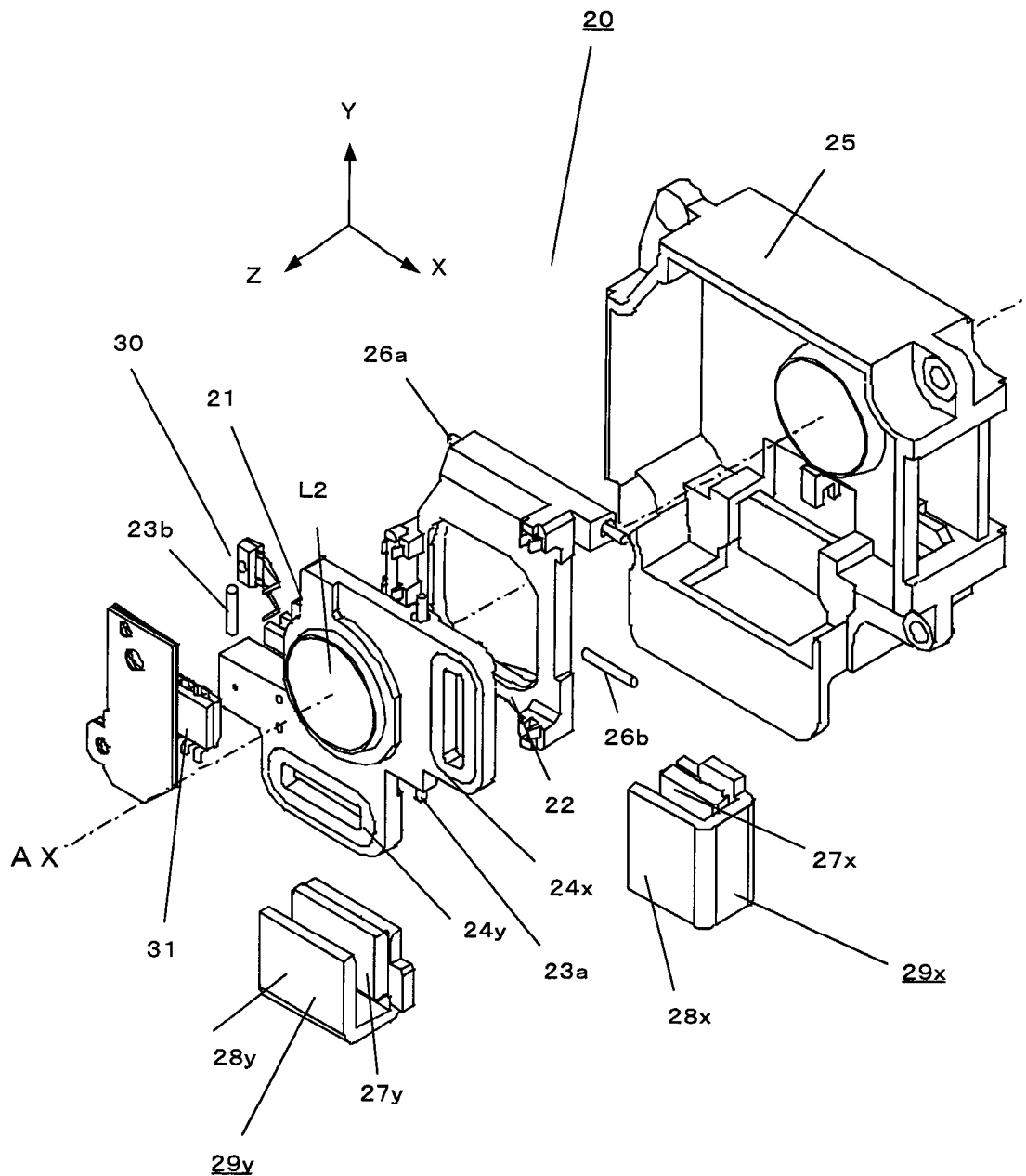
FIG. 4 is an exploded perspective view showing a configuration of a camera shake correcting mechanism in the camera shake correcting section of the imaging apparatus according to Embodiment 1.

FIG. 4 is an exploded perspective view showing the configuration of camera shake correcting mechanism 20 incorporated in camera shake correcting section 16 described above.

Camera shake correcting mechanism 20 employs a configuration comprised mainly of pitching move frame 21, yawing move frame 22, pitching shafts 23a and 23b, coils 24x and 24y, fixing frame 25, yawing shafts 26a and 26b, magnets 27x and 27y, yokes 28x and 28y, actuators 29x and 29y, light emitting element 30 and light receiving element 31.

The correction lens group L2 is fixed to pitching move frame 21. Pitching move frame 21 is held to yawing move frame 22 to be slidable in the Y direction through two pitching shafts 23a and 23b. Furthermore, coils 24x and 24y are fixed to pitching move frame 21. Yawing move frame 22 is held to be slidable in the X direction to fixing frame 25 through yawing shafts 26a and 26b. Magnet 27x and yoke 28x are held to fixing frame 25 and configure actuator 29x with coil 24x. In the same way, magnet 27y and yoke 28y are held to fixing frame 25 and configure actuator 29y with coil 24y. Light emitting element 30 is fixed to pitching move frame 21. Furthermore, light receiving element 31 is fixed to fixing frame 25, receives light emitted from light emitting element 30 and detects a two-dimensional position coordinate. Such light emitting element 30 and light receiving element 31 configure above-described position detecting section 15.

The operation of digital camera 1 having a camera shake correcting function and a photographing sensitivity changing function configured as shown above will be explained below.

First, selectable photographing modes of digital camera 1 will be explained. Photographing modes include, for example, "continuous shooting mode" in which shutter drive motor 42 is operated at 0.3 second intervals and two or more photographs are taken continuously, "sensitivity increasing & camera shake correction automatic selecting mode," "sensitivity increasing mode" and "camera shake correcting mode," which will be described later, and the photographer can select a desired photographing mode. When the photographing mode is selected, microcomputer 3 controls various control sections according to that photographing mode.

Figure 5:
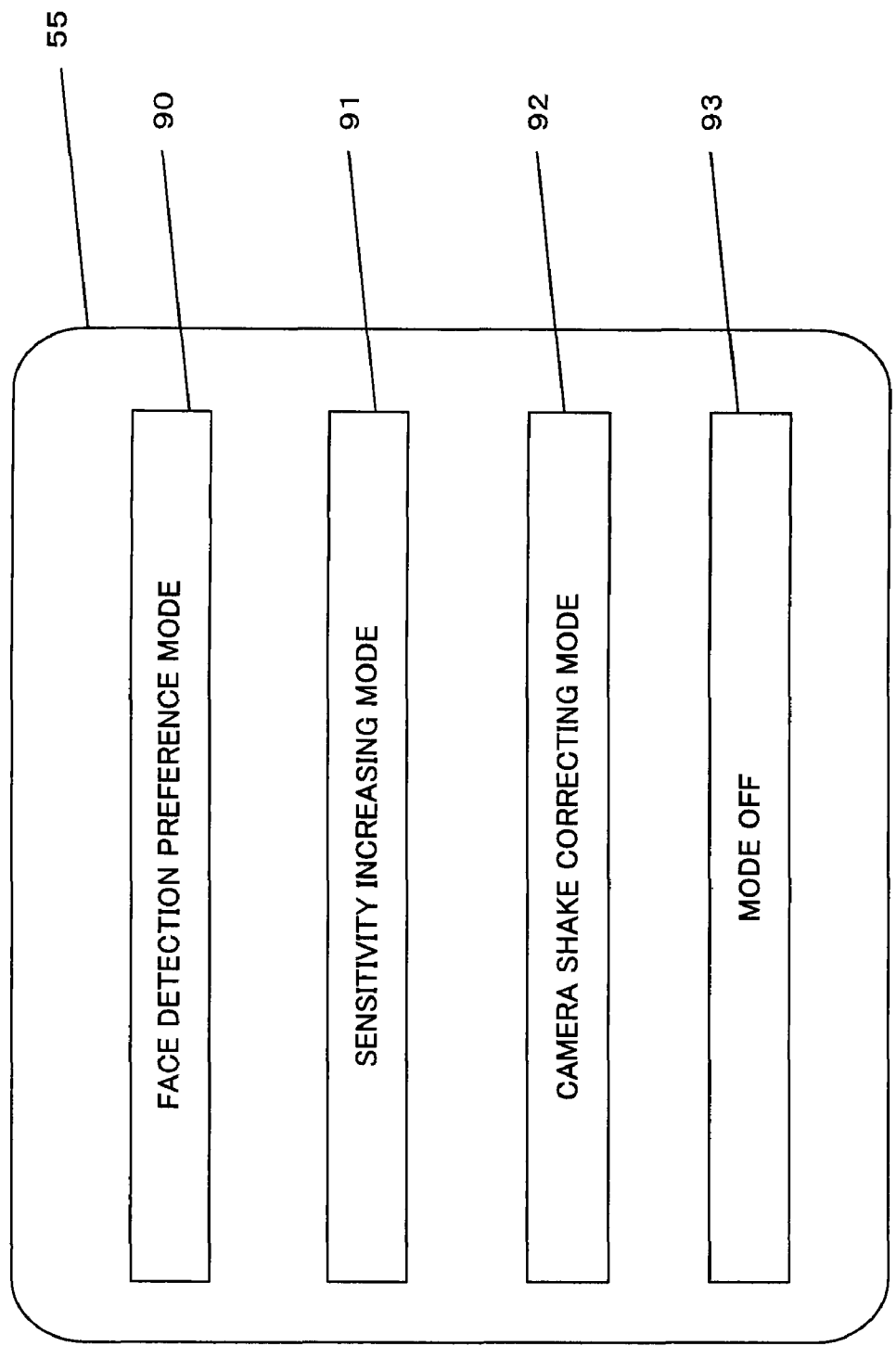
FIG. 5 shows a display example of a photographing mode selecting screen displayed on the display section of the imaging apparatus according to Embodiment 1.

FIG. 5 illustrates a display example of an photographing mode selecting screen displayed on display section 55. The photographing mode selecting screen can be displayed on display section 55 by the photographer operating MENU setting operation section 39 or operation cross key 38. As shown in FIG. 5, photographing modes include "face detection preference mode," "sensitivity increasing mode," "camera shake correcting mode" and "mode OFF," and the photographer can set a desired photographing mode by selecting between respective associated icons 90 to 93. FIG. 5 shows only characteristic photographing mode selecting icons of the present embodiment, but icons for selecting other photographing modes such as "continuous shooting mode" above may be further displayed.

When sensitivity increasing mode selecting icon 91 is selected, the photographing sensitivity is changed to high sensitivity ("sensitivity increasing mode"). That is, digital signal amplification section 110 amplifies an image signal by a predetermined gain according to a command from microcomputer 3. In this way, it is possible to make exposure time shorter and take a photograph at a higher shutter speed, and, consequently, reduce the influence of object shake.

When camera shake correcting mode selecting icon 92 is selected, the camera shake correcting function for reducing camera shake ("camera shake correcting mode") is started. That is, camera shake correcting mechanism 20 reduces camera shake by driving the correction lens group L2 in two directions in the plane perpendicular to the optical axis according to commands from microcomputer 3.

When face detection preference mode icon 90 is selected, microcomputer 3 detects the face of the photographing object, and when the photographing object is a child, microcomputer 3 automatically shifts to "sensitivity increasing mode" and increases the photographing sensitivity. Furthermore, microcomputer 3 increases the photographing sensitivity according to the moving speed of the photographing object. In this way, for a child who is restless in front of a camera, high photographing sensitivity is set and the shutter speed is increased, so that camera shake caused by the motion of the photographing object can be reduced.

When mode-off selecting icon 93 is selected, the above-described photographing sensitivity increasing function and the camera shake correcting function do not operate and a photograph is taken in normal mode.

Next, the photographing processing for when "face detection preference mode" is selected, will be explained using the flowchart of FIG. 6.

Figure 6:
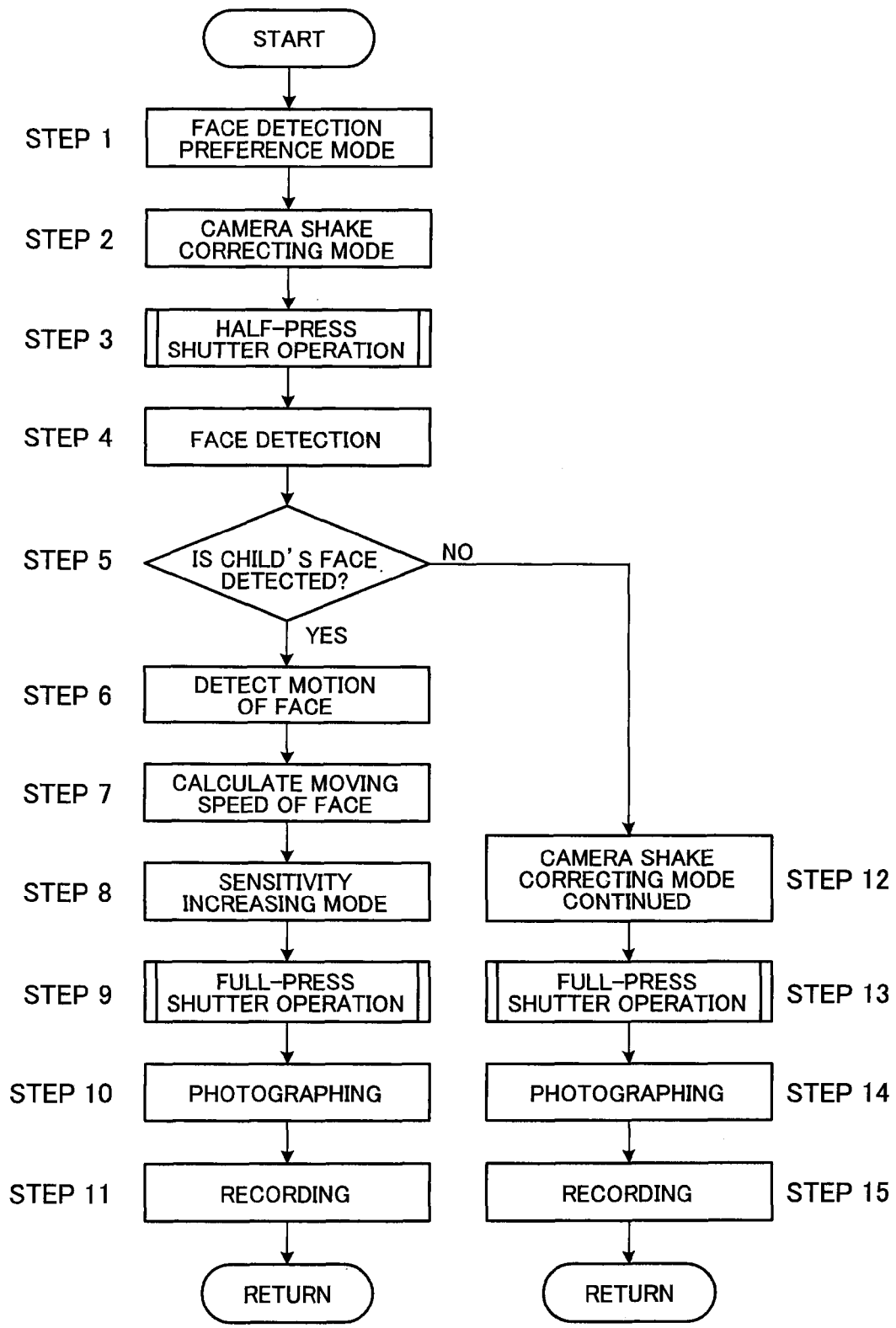
FIG. 6 is a flowchart showing photographing processing by the imaging apparatus according to Embodiment 1.

FIG. 6 is a flowchart showing the photographing processing of digital camera 1 executed by microcomputer 3. This flow starts when power switch 35 of digital camera 1 is operated "on."

In the processing in step 1, when the photographer operates MENU setting operation section 39 provided in the back of casing 1a of digital camera 1, a list of photographing modes is displayed on display section 55. When the photographer selects face detection preference mode icon 90 amongst the photographing mode selecting icons displayed, the process moves to step 2 and "camera shake correcting mode" is started.

In step 2, microcomputer 3 changes the photographing mode to "camera shake correcting mode" and starts camera shake correcting section 16 and camera shake correcting mechanism 20. Camera shake correcting section 16 detects camera shake occurring with the camera through angular velocity sensors 18x and 18y. According to a command from microcomputer 3, a current is supplied to coils 24x and 24y of pitching move frame 21 from an external circuit and the magnetic circuit comprised of actuators 27x and 27y makes pitching move frame 21 and the correction lens group L2 move in two directions X and Y in the plane perpendicular to the optical axis AX. In this case, light receiving element 31 detects the position of pitching move frame 21, thereby enabling position detection with high accuracy.

In step 3, microcomputer 3 recognizes that the photographer has operated shutter operation section 36, and microcomputer 3 moves the process to step 4.

In step 4, the face of the photographing object is detected. As one face detection method, there is a method of detecting contour information from the photographed image and detecting whether or not there are features (e.g., eyes, nose, mouth, etc.) with the detected contour. When the detected contour shows features, face detection section 120 decides that there is a face. Furthermore, face detection section 120 extracts an area including the detected face. Here, the processing of step 4 includes performing photometric processing and distance measuring processing at the same time as the face detection. For photometric processing, in motion detection processing, digital signal processing section 8 calculates the exposure value based on the image signal outputted from imaging sensor 4. Microcomputer 3 automatically sets adequate shutter speed based on the calculated exposure value. Furthermore, in the distance measuring processing, a focus control section (not shown) adjusts focus by moving the lens groups in the optical axis directions such that the contrast value of the image signal shows a peak. Furthermore, when a face cannot be detected as a photographing object, the process returns to "face detection preference mode" in step 1. Alternatively, if the situation where a face cannot be detected as a photographing object continues, "face detection preference mode" may be terminated and photographing in normal "camera shake correcting mode" may be continued.

In step 5, whether or not the face of the photographing object is the face of a child, is decided. Specific examples of the method of identifying children will be described later using FIG. 8 and FIG. 9. If, as a result of decision, the photographing object is a child, the process moves to step 6, whereas, if the photographing object is not a child, the process moves to step 12.

In step 6, the motion of the optical image of the face of the photographed child, is detected. Here, when the motion of the optical image of the face of the child to be photographed is detected, since camera shake correction has been carried out earlier, motion can be detected in a state where the influence of camera shake is reduced, so that the accuracy of motion detection can be improved. That is, it is possible to decide whether the motion of the image in imaging sensor 4 is caused by the motion of the photographing object or is influenced by the motion of the camera caused by camera shake by the photographer. Furthermore, in the motion detection processing, motion detection section 100 detects the motion of the optical image of the face of the photographing object to be photographed, and outputs a motion vector.

In step 7, microcomputer 3 calculates the moving speed Vh of the face of the photographing object per unit time from the motion vector detected by motion detection section 100.

Instep 8, microcomputer 3 changes the photographing mode to "sensitivity increasing mode." That is, digital signal gain setting section 111 sets a gain such that high photographing sensitivity is obtained. Here, microcomputer 3 sets the photographing speed according to the moving speed of the face of the photographing object. Therefore, microcomputer 3 calculates shutter speed that will not cause object shake from the moving speed Vh of the face of the photographing object, and sets photographing sensitivity at which the object can be photographed applying that shutter speed. For example, in an outdoor environment, photographing sensitivity is set according to the moving speed of the face of the photographing object, such that photographing sensitivity is set equivalent to ISO sensitivity 100 when the photographing object is moving slowly at a walking pace or set equivalent to ISO sensitivity 400 when the photographing object is moving at a running pace.

Although a case has been described above with the present embodiment where the face of a child of a photographing object is detected first and photographing sensitivity is set according to the moving speed of the face, if, in step 5, the photographing object is detected to be a child, photographing sensitivity may be automatically increased to a predetermined level. In that case, step 6 and step 7 are skipped.

If, in step 9, microcomputer 3 recognizes the full-press operation in the shutter operation section by the photographer, photographing processing is carried out in step 10. That is, in step 10, an optical image of the photographing object is formed in imaging sensor 4 and imaging sensor 4 outputs the image signal. Digital signal amplification section 110 then amplifies the image signal outputted from digital signal processing section 8 at the gain set in step 8.

In this way, in sensitivity increasing mode, photographing is performed at high sensitivity, that is, at higher ISO sensitivity than in normal mode or camera shake correcting mode. Furthermore, exposure time is set shorter so that the exposure value is substantially the same.

In step 11, the amplified image signal is recorded in image recording section 12 and the photographing processing is finished. Furthermore, when the image signal is recorded, the position of the AF area Fa with respect to the whole of the photographed image, is also recorded. Photographing is not limited to a single shot alone and continuous shooting may be performed.

In this way, when the photographing object is a child, high photographing sensitivity is automatically set assuming that the photographing object is likely to move. By this means, the exposure time can be made shorter and a photograph can be taken at a high shutter speed, so that object shake can be prevented. In photographing sensitivity increasing mode, the camera shake correcting mechanism may or may not be operated.

On the other hand, when the photographing object is detected to be an adult, not a child, it is decided that object shake will not occur, and the process moves to step 12. In the situation where object shake does not occur, ISO sensitivity, which is photographing sensitivity, is set to 64 or equivalent and the shutter speed is set to 1/30 second and so on.

In step 12, microcomputer 3 continues camera shake correcting mode as the photographing mode and operates camera shake correcting section 16 and camera shake correcting mechanism 20. Camera shake correcting section 16 detects the camera shake applied to the camera through angular velocity sensors 18x and 18y. In response to a command from microcomputer 3, a current is supplied to coils 24x and 24y of pitching move frame 21 from an external circuit and the magnetic circuit comprised of actuators 27x and 27y makes pitching move frame 21 and the correction lens group L2 move in two directions X and Y in the plane perpendicular to the optical axis AX. In this case, light receiving element 31 detects the position of pitching move frame 21, thereby enabling position detection with high accuracy.

If, in step 13, microcomputer 3 recognizes the full-press operation in shutter operation section 36 by the photographer, microcomputer 3 performs photographing processing in step 14. That is, a photographing object image is formed in imaging sensor 4, an image signal is outputted, and the outputted image signal is displayed in display section 55.

In step 15, the image signal is recorded in image recording section 12 and thereupon the photographing processing is finished. Furthermore, when the image signal is recorded, the position of AF area Fa with respect to the whole of the photographed image is also recorded. Photographing is not limited to a single shot alone and continuous shooting may be performed.

FIG. 7 also shows a display example where a photographed image is displayed on display section 55. Although not shown in FIG. 7, display section 55 may display ISO sensitivity, which is photographing sensitivity, with the photographed image.

In this way, when the photographing object is an adult, photographing sensitivity is not changed and the camera shake correcting function is started assuming that the photographing object is likely not to move. This reduces camera shake and allows an image of high quality to be taken.

Next, the method of identifying children will be explained with reference to FIG. 8 and FIG. 9.

[Method of Identifying Children Based on Height]

Figure 8:
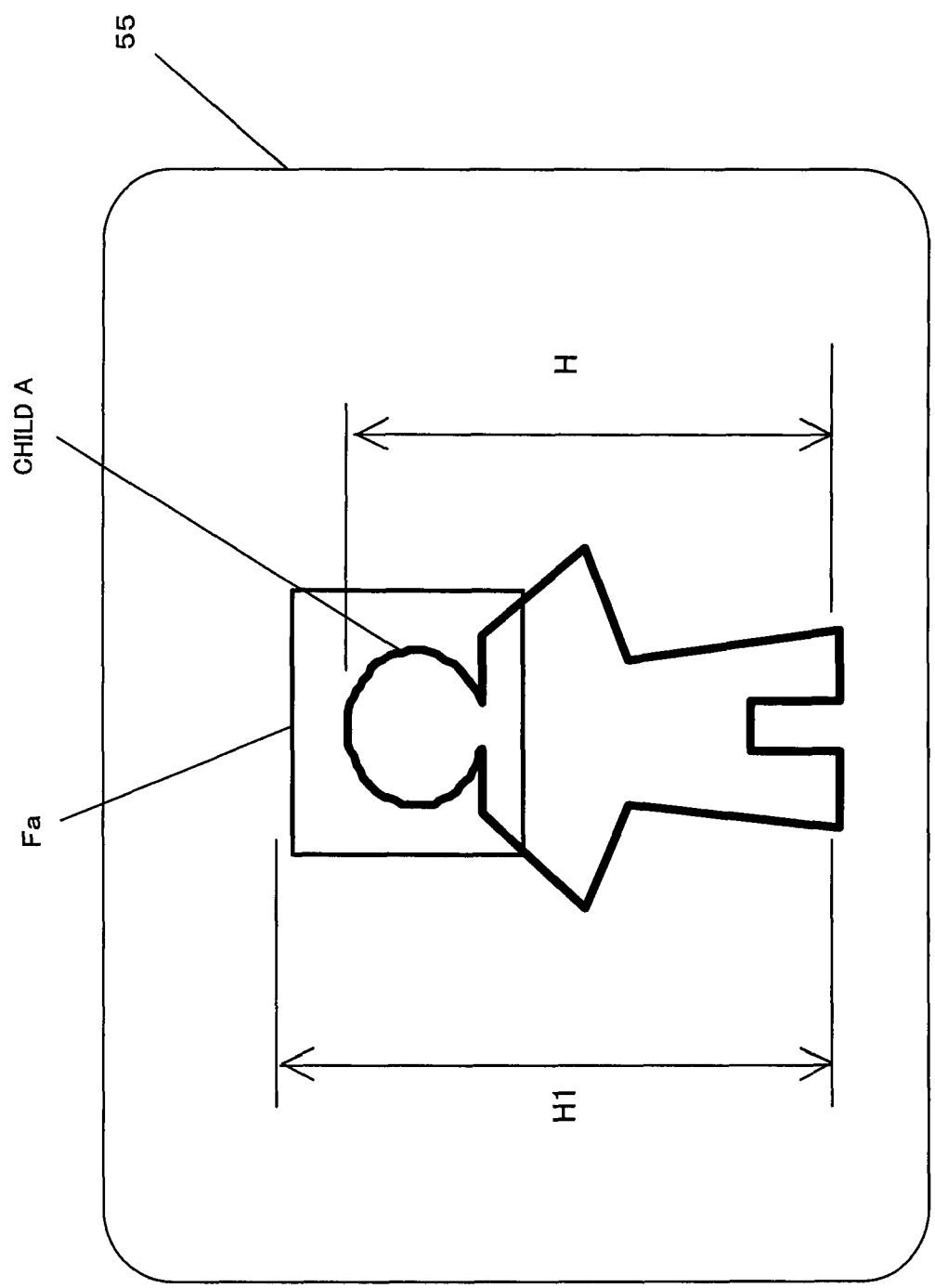
FIG. 8 shows a display example where identification of children based on height by the imaging apparatus according to Embodiment 1 is displayed on a display section.

FIG. 8 shows a display example where child identification based on height is displayed on display section 55.

In FIG. 8, AF area Fa is set for a child of the photographing object at a predetermined position in the photographing screen on which the face detection processing is performed. In this case, the AF area is assigned preferentially. The AF area assigned preferentially is displayed in a solid line and the rest is displayed in dotted lines. Furthermore, with respect to motion detection of the photographing object, the AF area displayed in solid lines is given priority.

Since the AF area of a solid line is set in the face of child A in FIG. 8, the motion of the face of child A is given priority in motion detection. Furthermore, in FIG. 8, H is the height of child A and H1 is the threshold between children and adults based on height.

Figure 9:
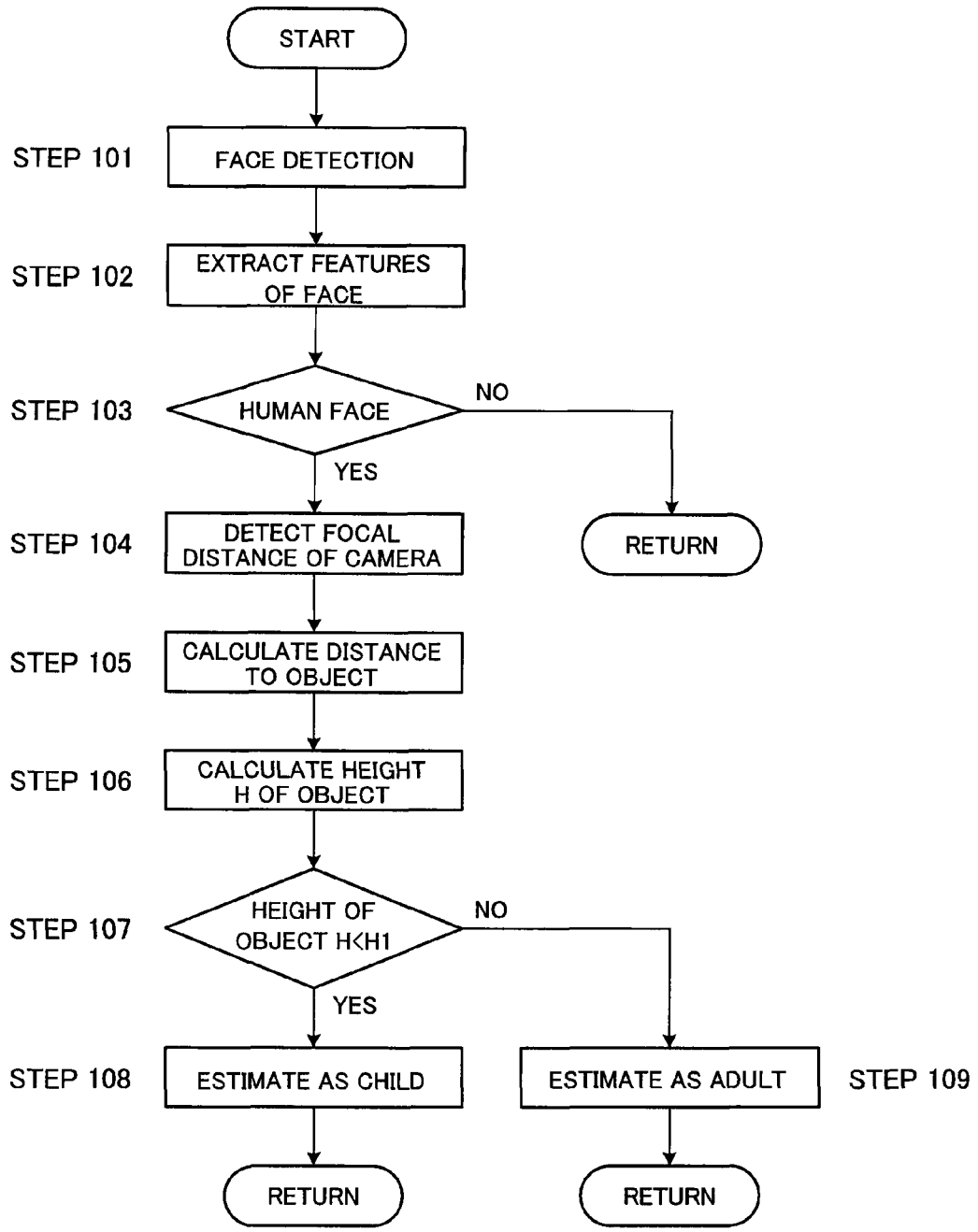
FIG. 9 is a flowchart showing child identifying processing based on height by the imaging apparatus according to Embodiment 1 of the present invention.

FIG. 9 is a flowchart showing the child identifying processing based on height and this may be executed as a subroutine of the face detection processing of the photographing object in step 5 in FIG. 6.

First, face detection for the photographing object is performed in step 101 and features of the face are extracted from detected image data of the face in step 102. Next, it is decided from the image data in step 103 whether or not the image data shows the face of a human, and, if it is not a human face, the flow is finished. Any technique may be used to detect and recognize a human face with eyes, nose and mouth and so on, from image data. When a human face is detected, the focal length of the camera is detected in step 104 and the distance to the photographing object is calculated in step 105.

Next, the height H of the photographing object is calculated in step 106. For example, the height H of child A, the photographing object, is calculated in FIG. 8. The height of the photographing object may be the eye level of the photographing object instead of the height of the photographing object.

In step 107, the height H of the photographing object is compared with a threshold H1 for between children and adults based on height. If the height H of the photographing object is lower than the threshold H1 (when H<H1), the photographing object is estimated to be a child in step 108 and the flow ends, whereas, if the height H of the photographing object is equal to or higher than the threshold H1, the photographing object is estimated to be an adult in step 109 and the flow ends. In the case of FIG. 8, since the height H of the photographing object is lower than the threshold H1, the photographing object is identified to be child A.

The above method of identifying children based on height allows decisions to be made based simply on a comparison of the height of the photographing object, thereby easily identifying children. However, there are cases where decisions cannot be made depending on the posture of the photographing object, such as when the photographing object is seated.

[Method of Identifying Children By Extracting Features]

By extracting features from image data, it is also possible to estimate that the photographing object is a child from facial features that are unique to children. Children's faces specifically show the following features a to d, so that, by comparing these features a to d with reference sample data of children's faces, it is possible to estimate that the object is a child. Here, the positions of eyes, nose, lips and so on can be determined from image data of the contours of the face.

a. Eyes are positioned around the center of the face
b. Jaws are short
c. Nose and lips are positioned low
d. Parts in the face are concentrated in the lower part All of the above described features a to d may be compared, or, if useful image data cannot be obtained, decisions may be made using part of the features a to d. Furthermore, the features a to d may be assigned weight.

The method of identifying children by extracting features needs only to detect the face of the photographing object, so that the method provides an advantage of not being influenced by the posture of the photographing object. Furthermore, when the face of the photographing object can be clearly detected, it is possible to identify, with high accuracy, that the photographing object is a child. However, the processing becomes slightly more complicated than the method of identifying children based on height.

The above-described method of identifying children based on height may be used together with the method of identifying children by extracting features. By this means, it is possible to decide, more accurately, that the photographing object is a child.

As described above, according to the present embodiment, when a specific photographing object such as a child or pet whose motion is difficult to predict is detected, the gain of the photographing sensitivity changing function is increased compared to when the photographing object is not a child or pet, ISO sensitivity is increased, the shutter speed is increased and exposure time is made shorter, so that it is possible to reduce image quality degradation caused by sudden move of the photographing object upon photographing.

More specifically, digital camera 1 detects the face of the photographing object and decides whether or not the photographing object is a child, and decides, when the photographing object is a child, that the object is likely to move in front of the camera, changes the photographing sensitivity to high sensitivity, makes exposure time shorter and photographs an image at a higher shutter speed. This prevents image quality degradation due to object shake. Furthermore, when the photographing object is not a child, digital camera 1 starts the camera shake correcting function, thereby preventing camera shake and reducing image quality degradation.

Furthermore, since the present embodiment sets photographing sensitivity according to the moving speed of the photographing object, the photographer needs not observe the motion of the photographing object to decide whether or not object shake occurs, thereby offering an improved level of convenience.

The present embodiment decides whether or not the photographing object is a child, but the photographing object may be anything whose motion is assumed difficult to predict. Embodiment 4 takes a pet as an example of a photographing object whose motion is difficult to predict. Furthermore, the method of detecting photographing objects including children is by no means limited, and the above-described child face identification by [extracting features] and child photographing object identification based on [height] or other methods may be employed as well. With a photographing object which is likely to move such as a child, it is possible to prevent object shake by increasing photographing sensitivity in advance and photograph the object.

Furthermore, to photograph a child or pet, child or pet photographing mode may be provided so that the photographer can set that mode.

Figure 20:
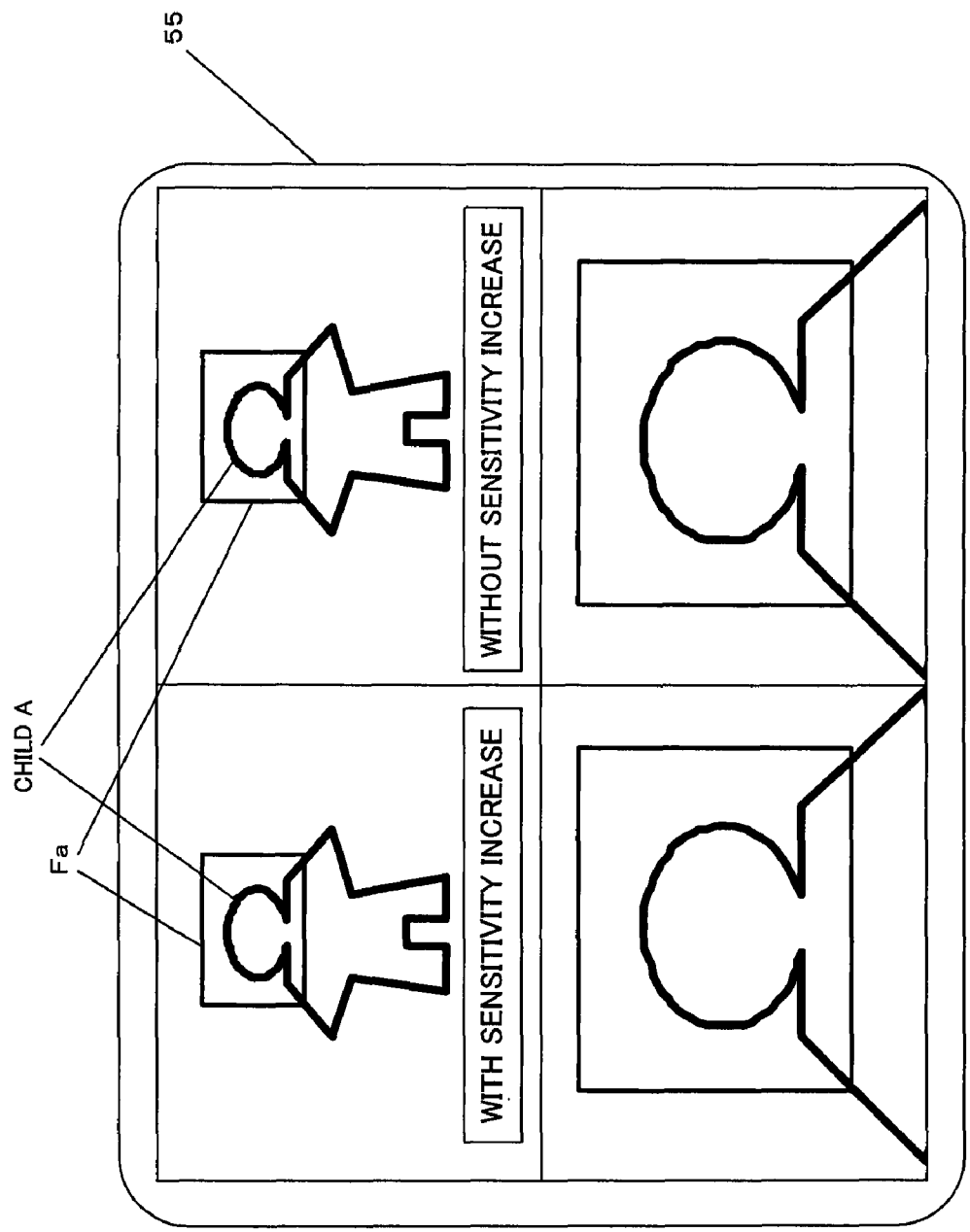
FIG. 20 shows a display example where an image taken with increased sensitivity after "photographing sensitivity increasing mode" of the imaging apparatus according to the present embodiment is set, and an image taken without increased sensitivity, are displayed on a display section according to Embodiment 1.

FIG. 20 shows a display example where an image taken with increased sensitivity after "photographing sensitivity increasing mode" of the imaging apparatus according to the present embodiment is set, and an image taken without increased sensitivity, are displayed in a display section.

Furthermore, as shown in FIG. 20, by continuously taking photographs in one shutter operation and taking photographs in varying photographing sensitivities, that is, by taking photographs with increased sensitivity and without increased sensitivity, photographs taken in the above two modes and their image quality can be compared in a simple manner immediately after photographing or upon playback. Furthermore, four photographed images may be displayed in display section 55 at the same time by automatically or manually enlarging the images around the center of AF area Fa using operation cross key 38 or the like. Furthermore, an upper limit to photographing sensitivity may be set to reduce quality degradation of photographed images.

Furthermore, when two photographed images are recorded, both images may be recorded or the photographer maybe allowed to select one image and erase the unnecessary one.

Furthermore, when a photographed image is played back, the whole of the image may be displayed or an enlarged view at arbitrary zoom factor may be displayed around the center of the AF area Fa recorded in the photographed image.

Furthermore, upon taking a photograph using a self-timer, the motion of an optical image of the photographing object may be detected from several seconds before a photograph is taken, after shutter operation section 36 is pressed full. Still better, an LED may be provided in the front of digital camera 1 to blink during motion detection, so that the photographing object can recognize this.

(Embodiment 2)

A case will be explained below with Embodiment 2 where the faces of a plurality of photographing objects are detected and photographing sensitivity is increased.

The hardware configuration of the imaging apparatus according to Embodiment 2 of the present invention is substantially the same as shown in FIGS. 1 to 3, and so the explanations will be omitted.

The digital camera according to the present embodiment differs from the digital camera according to Embodiment 1 in deciding whether or not there is a photographing object of an adult besides a photographing object of a child, among a plurality of photographing objects, and increasing photographing sensitivity. The same components as in Embodiment 1 will be assigned the same reference numerals and explanations will be focused upon points different from Embodiment 1.

Figure 10:
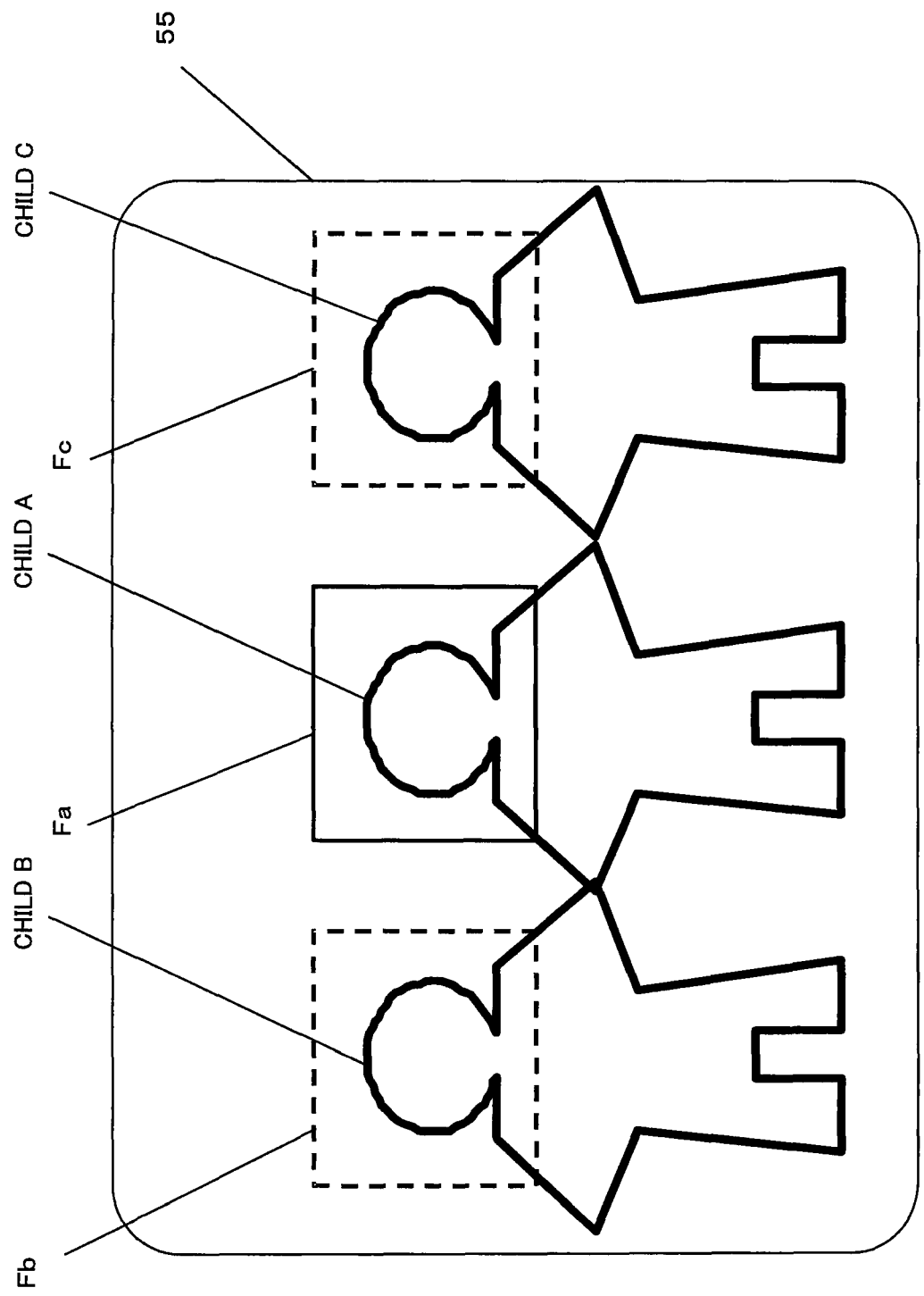
FIG. 10 shows a display example where how face detection is carried out for a plurality of children is displayed on a display section when an imaging apparatus according to Embodiment 2 of the present invention takes a photograph.

FIG. 10 shows a display example where how face detection is carried out for a plurality of children is displayed on display section 55 when a photograph is taken. In FIG. 10, AF areas Fa, Fb and Fc are set in predetermined positions on a shot screen where the faces of a plurality of photographing objects, namely child A, child B and child C, are detected. In this case, these AF areas are assigned preferentially to the photographing objects of children. In the present embodiment, AF areas with high priority are shown with solid lines.

Figure 11:
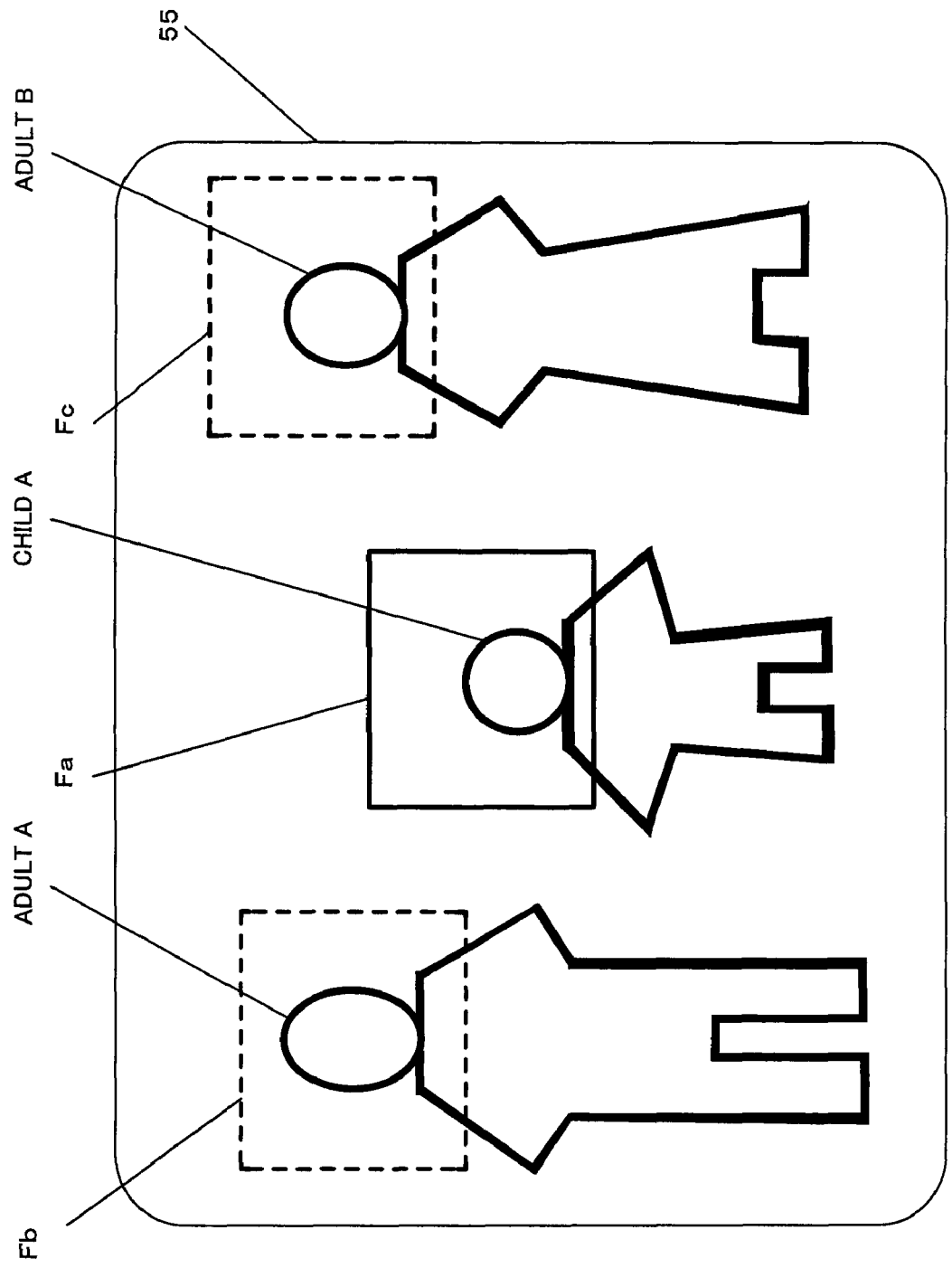
FIG. 11 shows a display example where how face detection is carried out for children with adults is displayed on a display section when the imaging apparatus according to Embodiment 2 takes a photograph.

FIG. 11 shows a display example where how face detection is carried out for children with adults, is displayed on display section 55 when a photograph is taken. In FIG. 11, there are three people of child A, adult A and adult B, together as photographing objects, and AF areas Fa, Fb and Fc are set in predetermined positions on the screen where faces are detected. In this case, AF areas are assigned preferentially to photographing objects of children. In the present embodiment, AF areas of high priority are shown with solid lines and the rest is shown with dotted lines. Furthermore, with respect to motion detection of the photographing objects, the AF areas shown with solid lines are given priority.

Now, a AF area of a solid line is set upon the face of child A. The number of AF areas is not limited to three and may be higher than that.

Next, the photographing processing upon selection of "face detection preference mode" will be explained using the flowchart of FIG. 9.

Figure 12:
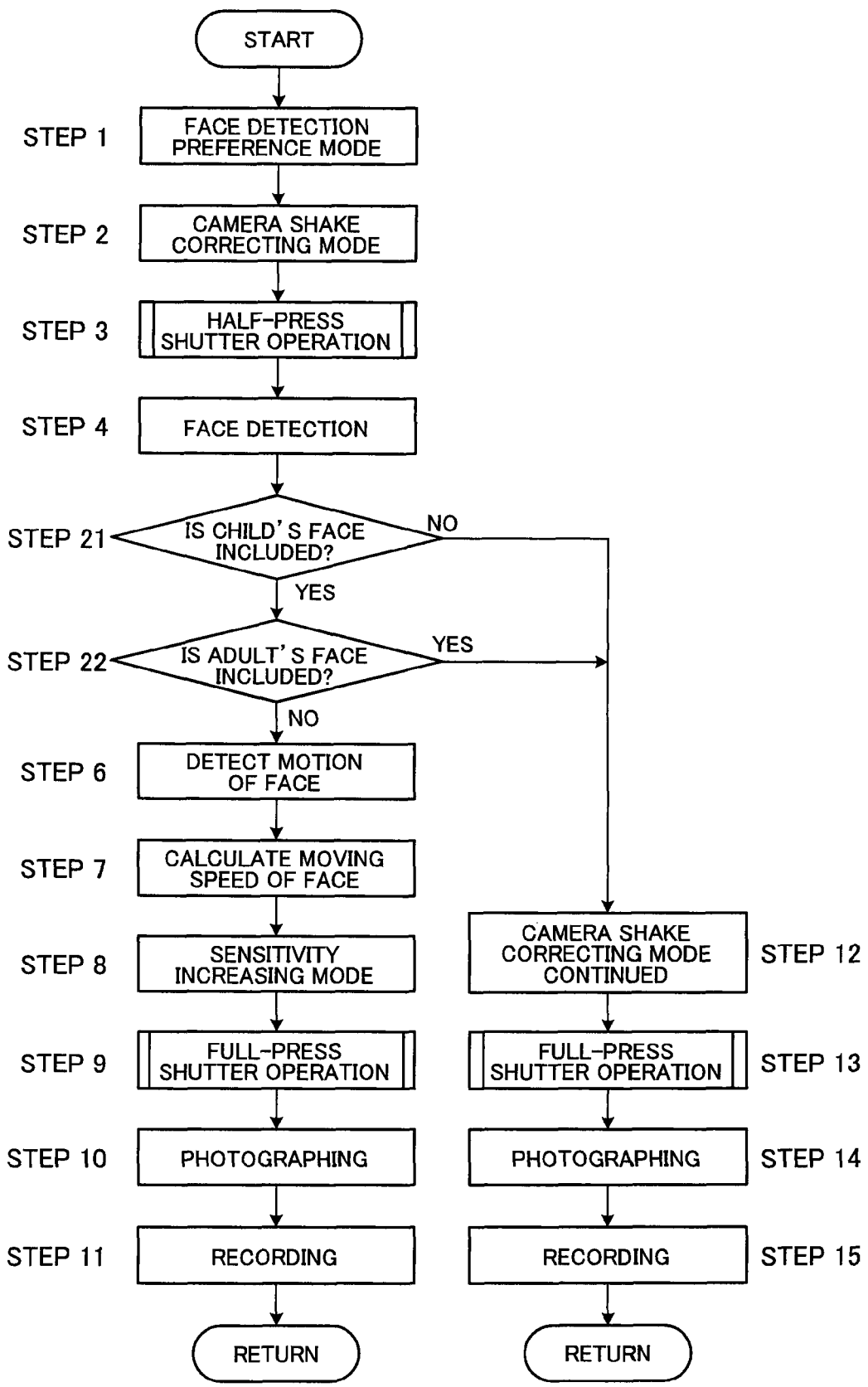
FIG. 12 is a flowchart showing photographing processing by the imaging apparatus according to Embodiment 2.

FIG. 12 is a flowchart showing photographing processing by digital camera 1 and steps carrying out the same processes as in the flow shown in FIG. 6 are assigned the same step numbers and overlapping explanations will not be repeated.

After the faces of the photographing objects are detected in step 4, the process moves to step 21.

In step 21, it is decided whether or not there is a photographing object of a child is among a plurality of photographing objects. Whether or not a photographing object of a child is included is decided using the child identifying method described in Embodiment 1. If as a result of the decision result a photographing object of a child is not included, the process moves to step 12. On the other hand, if a photographing object of a child is included, the process moves to next step 22.

In step 22, it is decided whether there is a photographing object of an adult among the plurality of photographing objects including a photographing object of a child. Whether or not there is a photographing object of an adult can be decided by adopting the methods of identifying children described in Embodiment 1, that is, by identifying adults based on height or based on features of faces of adults.

If as a result of the decision a photographing object of an adult is included, the process moves to step 12. On the other hand, if a photographing object of an adult is not included, the process moves to next step 6. This criterion is based on the following reason. As shown in FIG. 10, when a plurality of photographing objects are all children, namely child A, child B and child C, they are more likely to mess around. Therefore, when a plurality of photographing objects are all children, high photographing sensitivity is automatically set assuming that the photographing objects are likely to move and mess around. On the other hand, as shown in FIG. 11, even when there are children as photographing objects, if there is at least one adult with them, the photographing sensitivity is not increased assuming that the photographing objects are likely not to move being aware of the tension of the atmosphere. The situation shown in FIG. 11 is, for example, a ceremonial shot of parents and a child.

The present embodiment detects the face of a photographing object of a child and determines photographing sensitivity according to the moving speed, if in step 21 a photographing object of a child is detected, photographing sensitivity may be automatically increased to a predetermined level. In that case, step 6 and step 7 are skipped.

In this way, when the photographing object is a child, high photographing sensitivity is automatically set assuming that the photographing object is likely not to move. By this means, exposure time can be made shorter and a photograph can be taken at a high shutter speed, so that object shake can be prevented. In "sensitivity increasing mode," the camera shake correcting mechanism may or may not be operated.

On the other hand, if it is detected that there are adults besides children, it is decided that object shake will not occur, and the process moves to step 12. In the situation where no object shake occurs, ISO sensitivity, which is photographing sensitivity, is set to 64 or equivalent and the shutter speed is set to ⅓₀ second and so on.

In this way, if a photographing object of an adult is included, it is assumed that the photographing object is likely not to move, and the photographing sensitivity is not changed and the camera shake correcting function is started. This reduces camera shake and allows an image of high quality to be taken.

As described above, the present embodiment detects the presence of children and adults among photographing objects, and, if there are children alone who are likely to move in front of the camera, the photographing sensitivity is changed to high photographing sensitivity, exposure time is made shorter and a photograph is taken at a high shutter speed. Embodiment 1 has been described to change photographing sensitivity to high photographing sensitivity when the photographing object includes children. By contrast with this, when photographing objects of children are included, if there is an adult among them, the present embodiment decides that the children are not likely to mess around and does not change the photographing sensitivity to high photographing sensitivity and allows the camera shake correcting function to continue operating, so that camera shake is prevented and image quality degradation can be reduced. That is, the present embodiment continues "camera shake correcting mode" as long as possible and switches to "sensitivity increasing mode" when photographing objects include children alone. This prevents photographing sensitivity from being increased more than necessary.

Furthermore, since the present embodiment sets photographing sensitivity according to the moving speed of the photographing object, the photographer needs not observe the motion of the photographing object to decide whether or not object shake occurs, thereby offering an improved level of convenience. As a means for deciding whether or not children are with adults, the imaging apparatus may be provided with a microphone so as to analyze the volume and frequency characteristics of speech. For example, if the volume is large, it is decided that there are only children with no adult nearby, and this gives a criterion for changing the photographing sensitivity.

(Embodiment 3)

A case will be described below with Embodiment 3 where the face of a specific photographing object is detected from among a plurality of photographing objects and photographing sensitivity is increased.

The hardware configuration of the imaging apparatus according to Embodiment 3 of the present invention is substantially the same as in FIG. 1 to FIG. 3, and so the explanations will be omitted.

Figure 13:
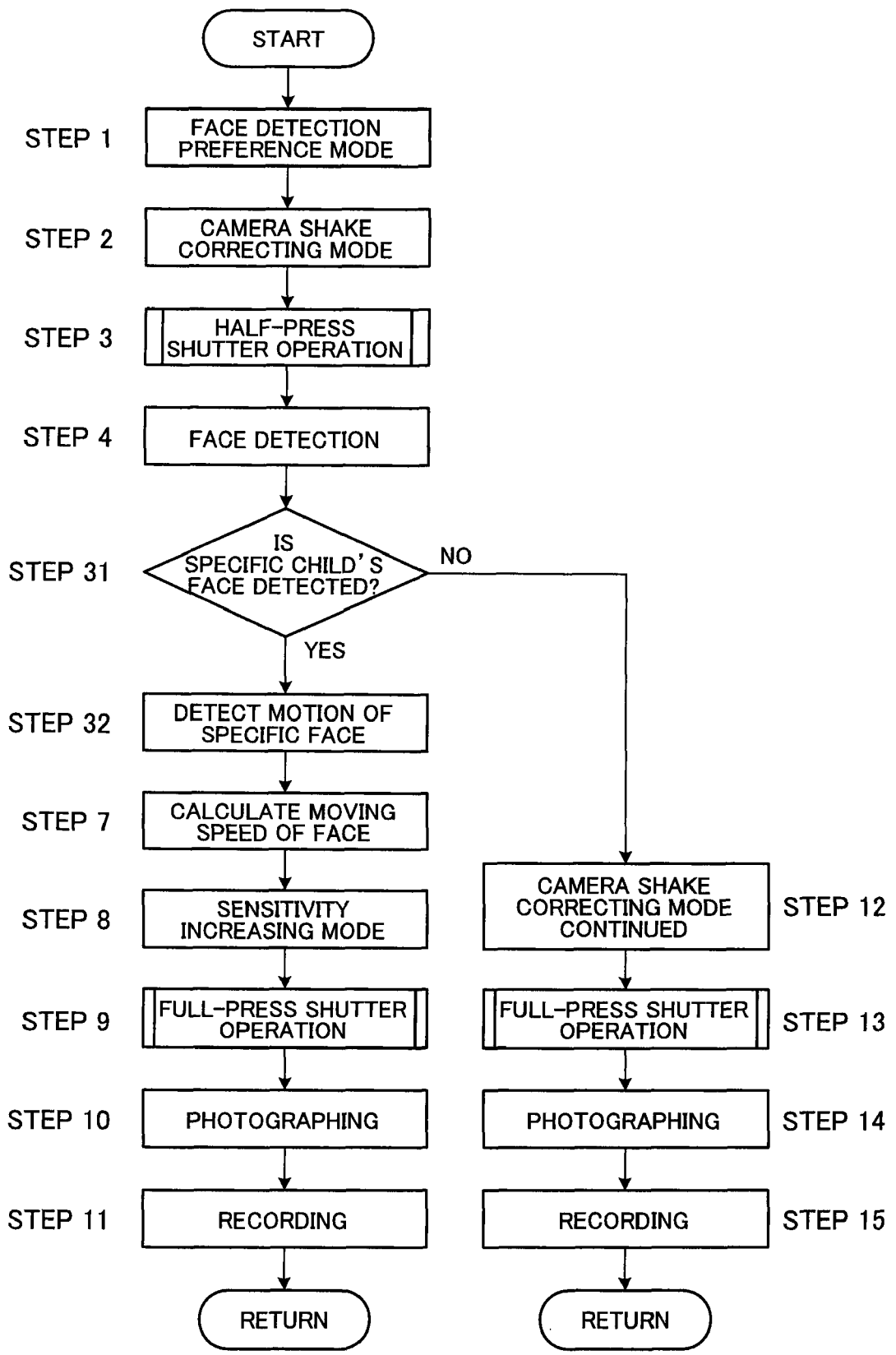
FIG. 13 is a flowchart showing photographing processing by an imaging apparatus according to Embodiment 3 of the present invention.

FIG. 13 is a flowchart showing photographing processing of digital camera 1 of Embodiment 3 of the present invention and steps of the same processing explained in the flowchart shown in FIG. 6 are assigned the same step numbers and overlapping explanations will not be repeated.

When the face of a photographing object is detected in step 4, the process moves to step 31.

In step 31, whether or not a photographing object of a specific child is included in photographing objects, is decided. The face of the photographing object of a specific child is identified by photographing the faces of specific photographing objects in advance and registering the data in a memory, and, when a photograph is to be taken, the photographing object is compared with the image data of faces in the memory. In this case, the specific photographing object may be the photographer's child, for example. That is, assumption is that the faces of photographing objects with which the photographer generally feels a high level of intimacy and which therefore the photographer considers important photographing objects, are stored in a memory in advance. If as a result of decision a photographing object of a specific child is not included as a photographing object, the process moves to step 12. However, if the child is included as a photographing object, the process moves to next step 32.

Here, as described in Embodiment 2, it is also possible to employ an example where, in addition, where or not an adult is included amongst a plurality of photographing objects including a photographing object of a specific child, is decided by adding the processing of step 22 of FIG. 12. Furthermore, the specific photographing object is not limited to a child, and any photographing object whose motion is difficult to predict may be registered in a memory. An example of this will be described later with Embodiment 4.

In step 32, the motion of the face of a photographing object of a specific child is detected. Here, when the motion the face of a photographing object of a specific child is detected, since camera shake correction has been carried out earlier, motion can be detected in a state where the influence of camera shake is reduced, so that the accuracy of motion detection can be improved. That is, it is possible to decide whether the motion of the image in imaging sensor 4 is caused by the motion of the photographing object or is influenced by the motion of the camera caused by camera shake by the photographer. Furthermore, in the motion detection process, motion detection section 100 detects the motion of the face of the object to be photographed, and outputs a motion vector.

Although the present embodiment is described to detect the face of a photographing object of a specific child according to its moving speed, if the photographing object is detected to be a specific child in step 31, photographing sensitivity may be automatically increased to a predetermined level. In that case, step 32 and step 7 are skipped.

In this way, when the photographing object is a specific child, high photographing sensitivity is automatically set assuming that the photographing object is likely to move. By this means, exposure time can be made shorter and a photograph can be taken at a high shutter speed, so that object shake can be prevented. Incidentally, in "sensitivity increasing mode," the camera shake correcting mechanism may or may not be operated.

On the other hand, if it is decided in step 31 above that the photographing object is not a specific child, no object shake occurs, or, even if slight object shake occurs, it is decided that the object is not a photographing object which the photographer considers an important photographing target, and image quality should be kept without shifting the mode to "sensitivity increasing mode" and the process is made to move to step 12. In the situation where object shake does not occur, ISO sensitivity, which is photographing sensitivity, is set to 64 or equivalent and the shutter speed is set to 1/30 second and so on.

In this way, when the photographing object is not a specific child, the photographing sensitivity is not changed and the camera shake correcting function is started assuming that the photographing object is not an object the photographer considers an important photographing target. This reduces camera shake and allows an image of high quality to be taken.

As described above, with the present embodiment, if the photographing object is a specific child, photographing sensitivity is changed to a high sensitivity level, exposure time is made shorter and an image is taken at a high shutter speed. Embodiments 1 and 2 have been described to change photographing sensitivity to high sensitivity when the photographing object includes children. By contrast with this, the present embodiment does not change photographing sensitivity to high sensitivity even when there is a photographing object of a child unless the child is a specific child registered in advance in the memory such as the photographer's child, and continues the operation of the camera shake correcting function, thereby preventing photographing sensitivity from being increased more than necessary. Unless the photographer considers the photographing object a photographing target of particular importance, the present embodiment takes an image in good image quality without increasing photographing sensitivity.

Although a case has been described above with the present embodiment where the specific photographing object is a child, the specific photographing object is not limited to a child and can be any photographing object (for example, an adult), if the photographer has that photographing object registered in advance in the memory as a specific photographing object.

(Embodiment 4)

Cases have been described above with Embodiments 1 to 3 where a child is an example of a photographing object whose motion is difficult to predict. According to Embodiments 1 to 3, when a child who is likely to move suddenly is recognized, ISO sensitivity is automatically increased compared to other photographing modes and the shutter speed is set faster, making it possible to take a photograph without object shake.

Photographing objects whose motion is difficult to predict are not limited to children and may include pets. Accordingly, a case will be described with Embodiment 4 where the photographing object whose motion is difficult to predict is a pet.

Figure 14:
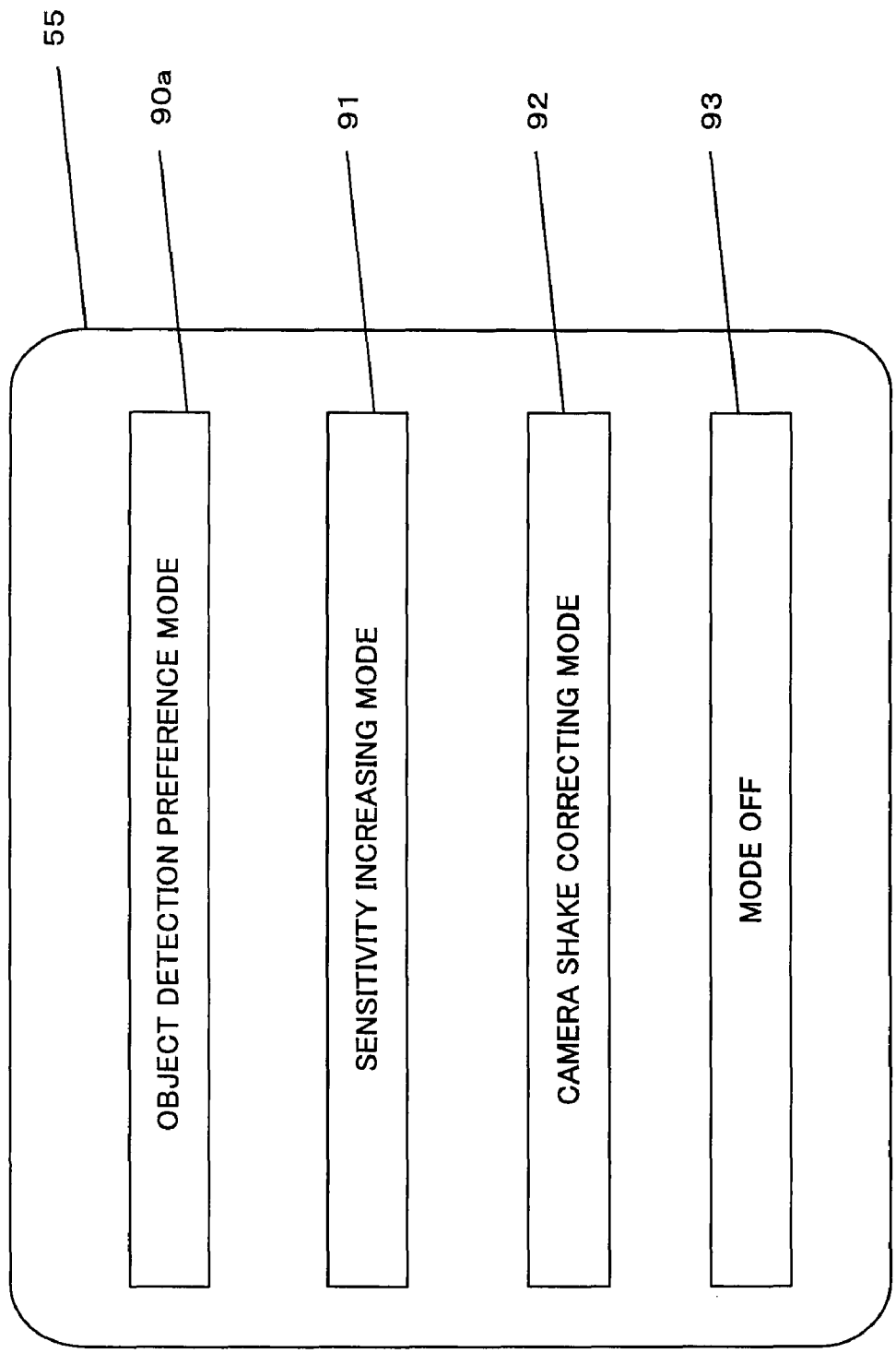
FIG. 14 shows a display example of an imaging mode selecting screen displayed on a display section of an imaging apparatus according to Embodiment 4 of the present invention.

FIG. 14 shows a display example of a photographing mode selecting screen displayed on display section 55 of an imaging apparatus according to Embodiment 4 of the present invention. The same components as those shown in the display example of FIG. 5 will be assigned the same reference numerals and overlapping explanations will not be repeated.

The photographer can display the photographing mode selecting screen on display section 55 by operating MENU setting operation section 39 or operation cross key 38. As shown in FIG. 14, photographing modes include "photographing object detection preference mode," "sensitivity increasing mode," "camera shake correcting mode" and "mode OFF," and the photographer can set the mode to a desired photographing mode by selecting between respective associated icons 90 to 93. FIG. 14 shows only characteristic photographing mode selecting icons of the present embodiment, but icons for selecting other photographing modes such as "continuous shooting mode" above may be additionally displayed. Furthermore, "face detection preference mode" mentioned earlier may be included in "photographing object detection preference mode."

When photographing object detection preference mode icon 90a is selected, microcomputer 3 detects a moving photographing object, and, if the photographing object is a child or pet, automatically shifts to "sensitivity increasing mode" and increases photographing sensitivity. Furthermore, microcomputer 3 increases photographing sensitivity according to the moving speed of the photographing object. By this means, with a child or pet that is restless in front of a camera, photographing sensitivity is set to high sensitivity, so that it is possible to reduce object shake caused by the motion of the photographing object.

Next, the photographing processing when "photographing object detection preference mode" is selected will be explained using the flowchart of FIG. 15.

Figure 15:
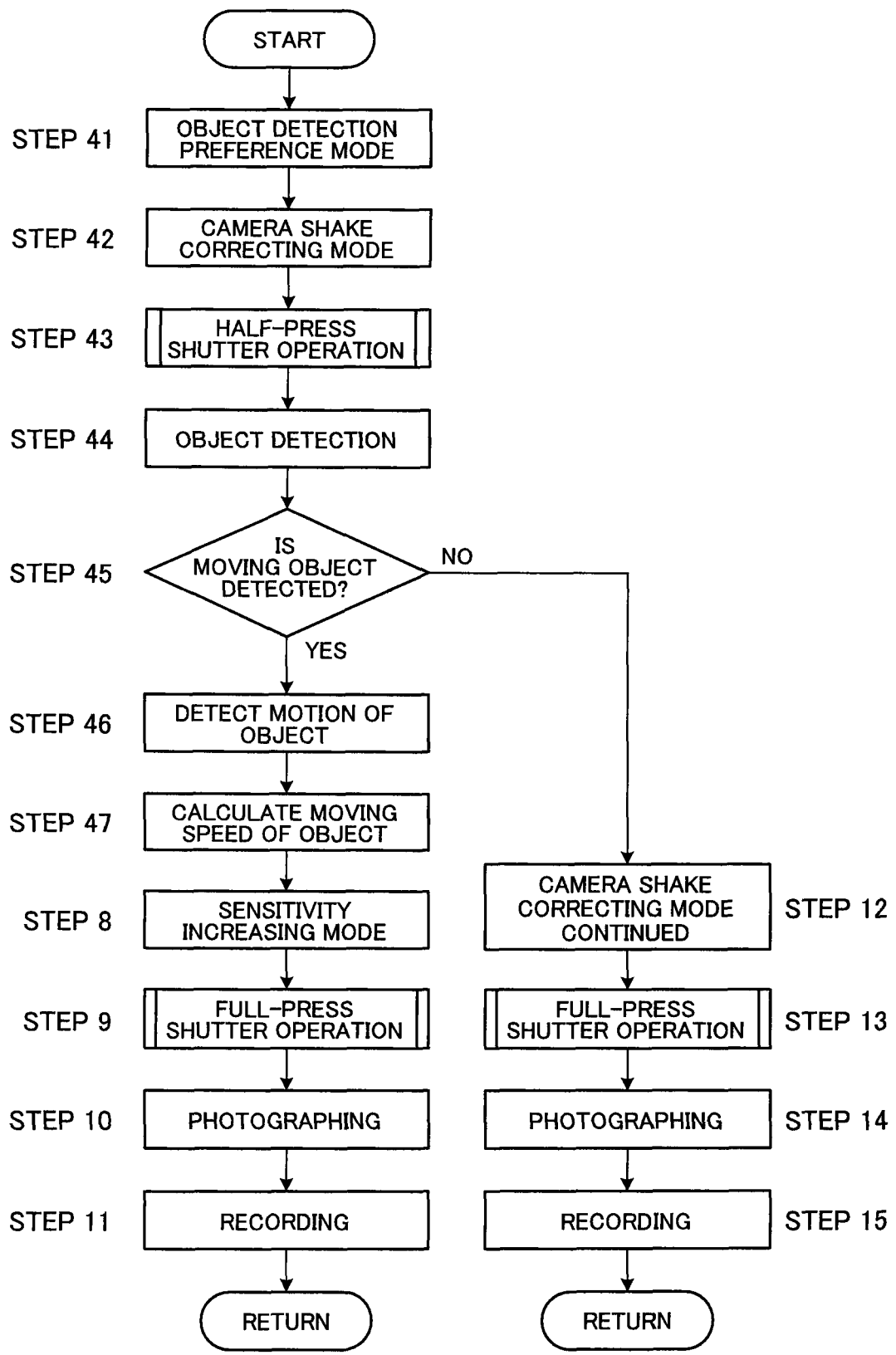
FIG. 15 is a flowchart showing photographing processing by the imaging apparatus according to Embodiment 4.

FIG. 15 is a flowchart showing the photographing processing by digital camera 1 executed by microcomputer 3. This flow is started when, for example, power switch 35 of digital camera 1 is operated "on."

In the processing in step 41, when the photographer operates MENU setting operation section 39 provided in the back of casing 1a of digital camera 1, a list of photographing modes is displayed in display section 55. When the photographer selects photographing object detection preference mode icon 90a among the photographing mode selecting icons displayed, the process moves to step 42 and "camera shake correcting mode" is started.

In step 43, microcomputer 3 recognizes that the photographer has operated shutter operation section 36, and shifts the process to step 44.

In step 44, a photographing object whose motion is difficult to predict, such as a child or pet (animal) (hereinafter referred to as a "moving photographing object"), is detected. Here, in the process of step 44, photometric processing and distance measuring processing are performed at the same time with moving object detection. In the photometric processing, digital signal processing section 8 calculates the exposure value based on the image signal outputted from imaging sensor 4. Microcomputer 3 automatically sets adequate shutter speed based on the calculated exposure value. Furthermore, in the distance measuring processing, a focus control section (not shown) adjusts focus by moving the lens groups in the optical axis directions such that the contrast value of the image signal shows a peak. Furthermore, when no moving photographing object is detected, the process returns to "photographing object detection preference mode" in step 41. Alternatively, when the condition in which no moving photographing object can be detected continues, "photographing object detection preference mode" may be terminated and photographing in normal "camera shake correcting mode" may be continued.

In step 45, whether or not the moving photographing object has been detected successfully, is decided. The moving photographing object identification adopts the method of identifying children by extracting features, described with Embodiment 1. General examples of moving pets include dogs and cats examples of moving animal include race horses. Information about features of the ears of these dogs and cats is stored in a memory and compared with image information of the photographed object, to decide whether the object is a specific photographing object. If as a result of the decision the photographing object is a child, the process moves to step 46, whereas, when the photographing object is not a child, the process moves to step 12.

In step 46, the motion of the moving photographing object is detected. Here, when the motion of the moving photographing object is detected, since camera shake is corrected, motion can be detected in a state where the influence of camera shake is reduced, so that the accuracy of motion detection can be improved. That is, it is possible to decide whether the motion of the image in imaging sensor 4 is caused by the motion of the photographing object or is influenced by the motion of the camera caused by camera shake by the photographer. Furthermore, in the motion detection process, motion detection section 100 detects the motion of the moving photographing object to be photographed, and outputs a motion vector.

In step 47, microcomputer 3 calculates the moving speed Vh of the moving photographing object per unit time from the motion vector detected in motion detection section 100. In step 8, microcomputer 3 changes the photographing mode to "sensitivity increasing mode." That is, digital signal gain setting section 111 sets gain so as to achieve high photographing sensitivity. Here, microcomputer 3 sets photographing sensitivity according to the moving speed of the moving photographing object. Therefore, microcomputer 3 calculates shutter speed that will not cause object shake from the moving speed Vh of the face of the photographing object, and sets photographing sensitivity at which the object can be photographed applying that shutter speed. For example, in an outdoor environment, photographing sensitivity is set equivalent to ISO sensitivity 100 upon photographing an object moving slowly at a walking pace or set equivalent to ISO sensitivity 400 upon photographing an object moving at a running pace.

Processes from step 8 onward are the same as those in the flow of FIG. 6 or the like.

The present embodiment detects a pet and determines photographing sensitivity according to its moving speed, but, when the photographing object is detected to be a pet in step 45, the sensitivity may be automatically increased to a predetermined level. In this case, step 46 and step 47 are skipped.

In this way, when the photographing object is a fast-moving photographing object such as a child or pet, high photographing sensitivity is automatically set assuming that the photographing object is likely to move and move fast. By this means, exposure time can be made shorter and a photograph can be taken at a high shutter speed, so that object shake can be prevented. Incidentally, in photographing sensitivity increasing mode, the camera shake correcting mechanism may or may not be operated.

On the other hand, when it is decided in step 45 above that the photographing object is not a fast-moving photographing object such as a child or pet, it is decided that no object shake occurs, and the process moves to step 12. In the situation where no object shake occurs, ISO sensitivity, which is photographing sensitivity, is set to 64 or equivalent and the shutter speed is set to 1/30 second and so on.

In this way, when the photographing object is not a fast-moving photographing object such as a child or pet, the photographing sensitivity is not changed assuming that the photographing object is likely not to move, and the camera shake correcting function is started. This reduces camera shake and allows an image of high quality to be taken.

As described above, according to the present embodiment, when a specific photographing object whose motion is difficult to predict such as a pet is detected, the gain of the photographing sensitivity changing function is increased compared to when no photographing object such as a pet is detected, exposure time is made shorter by increasing ISO sensitivity and/or increasing the shutter speed, so that it is possible to reduce image quality degradation due to camera shake or object shake and easily take a photograph in good image quality.

More specifically, the face of a pet such as a dog or cat is identified, and, if the photographing object is an animal such as a pet, photographing sensitivity is automatically increased. Whether or not the photographing object is a pet may be decided based on, for example, the size of ears. Furthermore, the configuration may be modified to increase photographing sensitivity when there are only children and animals as photographing objects, so that, in a situation where the photographing is likely to move (for example, when a child holding a pet is to be photographed), it is possible to prevent object shake by taking an image with increased photographing sensitivity.

(Embodiment 5)

A case will be explained below with Embodiment 5 where the camera shake correcting function and the photographing sensitivity changing function are switched based on the speed of the photographing object such as a child or pet.

Figure 16:
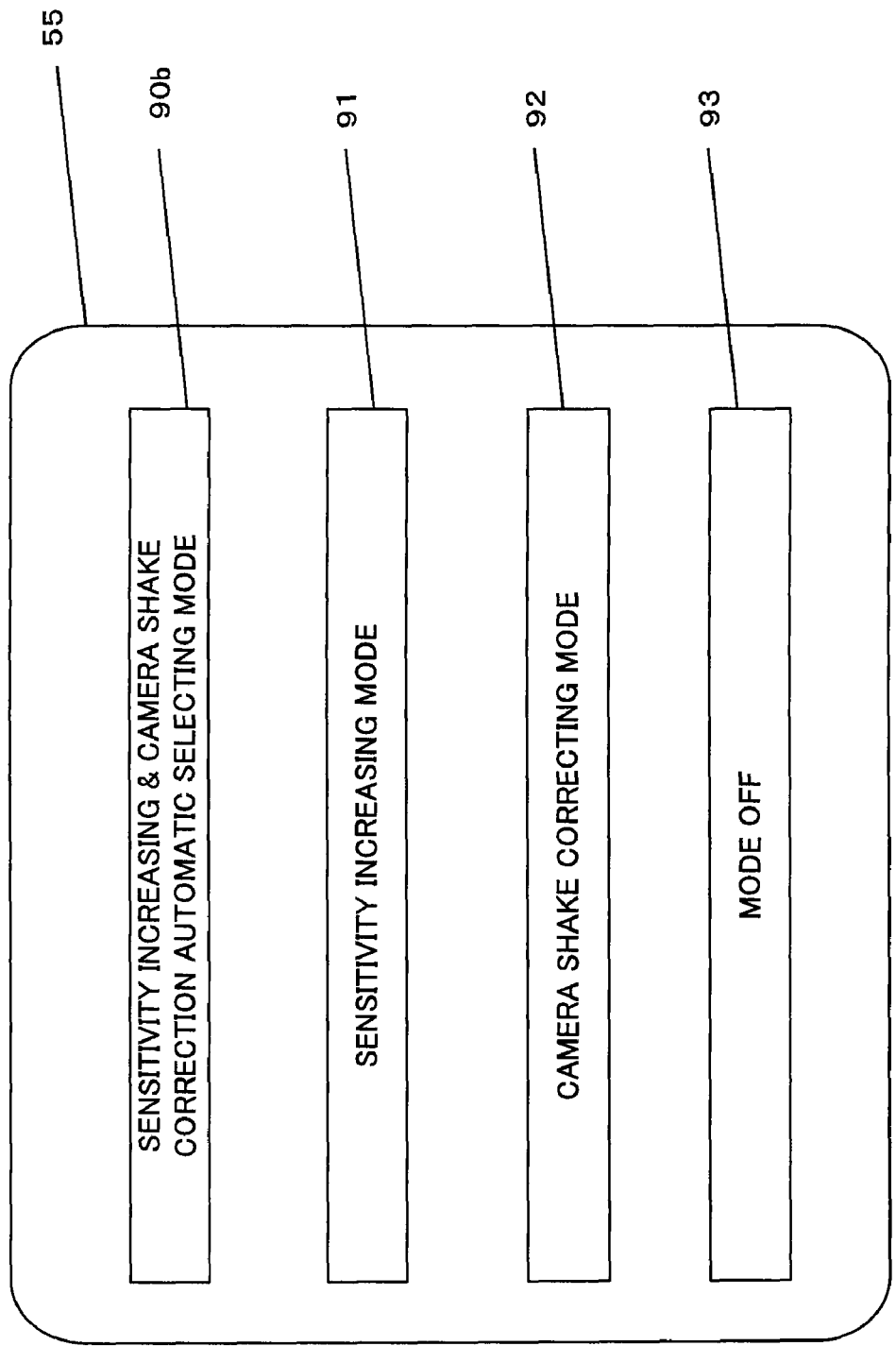
FIG. 16 shows a display example of an imaging mode selecting screen displayed on a display section of an imaging apparatus according to Embodiment 5 of the present invention.

FIG. 16 shows a display example of a photographing mode selecting screen displayed on display section 55 of an imaging apparatus according to Embodiment 5 of the present invention.

FIG. 16 shows a display example of a photographing mode selecting screen displayed on display section 55. The same components as those shown in FIG. 5 will be assigned the same reference numerals and overlapping explanations will not be repeated. The photographer can display the photographing mode selecting screen on display section 55 by operating MENU setting operation section 39 or operation cross key 38. As shown in FIG. 16, the photographing modes include "sensitivity increasing & camera shake correction automatic selecting mode," "sensitivity increasing mode," "camera shake correcting mode" and "mode OFF," and the photographer can set a desired photographing mode by selecting between respective associated icons 90 to 93. FIG. 5 shows only photographing mode selecting icons of the present embodiment, but selecting icons for other photographing mode such as "continuous shooting mode" above may be further displayed.

When sensitivity increasing & camera shake correction automatic selecting mode icon 90b is selected, microcomputer 3 automatically changes the mode to one of "sensitivity increasing mode" and "camera shake correcting mode" according to the moving speed of the photographing object. In this way, when the photographing object moves at such speed that causes object shake, high photographing sensitivity is set, whereas, when the photographing object moves at such slow speed that does not cause object shake, a camera shake correcting function for reducing camera shake is started.

Next, the photographing processing for when "sensitivity increasing & camera shake correction automatic selecting mode" is selected, will be explained using the flowchart of FIG. 17.

Figure 17:
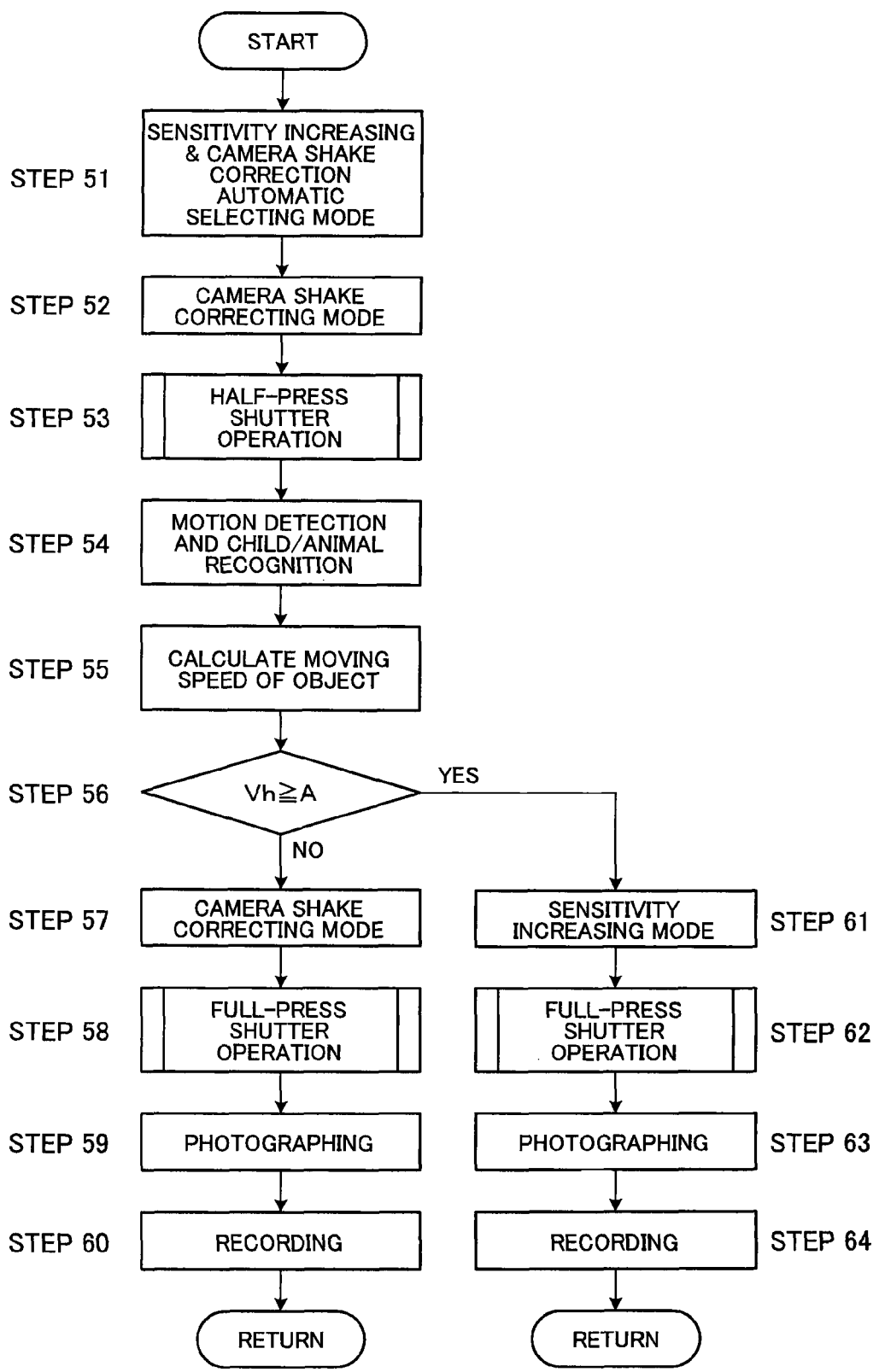
FIG. 17 is a flowchart showing photographing processing by the imaging apparatus according to Embodiment 5.

FIG. 17 is a flowchart showing the photographing processing of digital camera 1 executed by microcomputer 3. This flow starts when power switch 35 of digital camera 1 is operated "on."

In the processing in step 51, when the photographer operates MENU setting operation section 39 provided in the back of casing 1a of digital camera 1, a list of photographing modes is displayed on display section 55. Furthermore, when the photographer selects sensitivity increasing & camera shake correction automatic selecting mode icon 90b among the displayed photographing mode selecting icons, the flow proceeds to step 52.

In step 52, microcomputer 3 changes the photographing mode to "camera shake correcting mode" and starts camera shake correcting section 16 and camera shake correcting mechanism 20. Camera shake correcting section 16 detects camera shake occurring on the camera through angular velocity sensors 18x and 18y. According to command from microcomputer 3, a current is supplied to coils 24x and 24y of pitching move frame 21 from an external circuit and the magnetic circuit comprised of actuators 27x and 27y makes pitching move frame 21 and the correction lens group L2 move in two directions X and Y in the plane perpendicular to the optical axis AX. In this case, light receiving element 31 detects the position of pitching move frame 21, thereby enabling position detection with high accuracy.

In step 53, when microcomputer 3 recognizes that the photographer has operated shutter operation section 36, microcomputer 3 shifts the process to step 54.

In step 54, motion detection processing of the photographing object and recognition processing of a photographing object whose motion is difficult to predict such as a child or pet, are performed. In the motion detecting processing, motion detecting section 100 detects the motion of the object to be photographed by tracking the representative points of the photographed image, and outputs a motion vector. Furthermore, photometric measuring processing and distance measuring processing are performed at the same time with the motion detecting processing. In the photometric measuring processing, digital signal processing section 8 calculates the exposure value based on the image signal outputted from imaging sensor 4. Microcomputer 3 automatically sets adequate shutter speed based on the calculated exposure value. Furthermore, in the distance measuring processing, a focus control section (not shown) adjusts focus by moving the lens groups in the optical axis directions such that the contrast value of the image signal shows a peak. At the same time, in step 54, recognition processing on a fast-moving photographing object is performed. This photographing object recognition processing may be performed by registering a variety of images of fast-moving photographing objects such as children, pets or cars in advance and performing pattern matching between these registered images and photographed images.

In step 55, microcomputer 3 calculates the moving speed Vh of the photographing object per unit time from the motion vector detected in motion detecting section 100.

In step 56, the moving speed Vh is identified. A predetermined value A is registered in advance in digital camera 1, and microcomputer 3 compares the moving speed Vh with the predetermined value A. Here, this predetermined value A represents a threshold at which object shake occurs and may be a camera-specific value or may be arbitrarily set by the photographer.

For example, when the flash lamp is used, shutter speed can be made faster, so that photographing sensitivity does not increase more than necessary by increasing the threshold. On the other hand, when taking a photograph of a night view or when taking a photograph in a darkroom, if the distance to the photographing object is too far for flash lamp light to reach, or if the focal length is long and the influence of camera shake is significant, as in the case of telephotography, it is also possible to reduce the threshold and give priority to photographing sensitivity, according to the distance to the photographing object or the focal length. Furthermore, the threshold may be made variable according to image quality set when taking a photograph. For example, when photographing in the highest image quality (e.g., RAW file format (not compressed)), the threshold is increased to avoid image quality degradation due to increase of photographing sensitivity, and when photographing in standard image quality, priority may be given to increasing photographing sensitivity by reducing the threshold.

The present embodiment is characterized in that the above-described threshold A is not a fixed value but can be a plurality of thresholds A1, A2, ..., and thresholds A1, A2, ..., are set adaptively according to the photographing object. Here, the above-described threshold A normally has two values, threshold A1 for normal photographing mode and threshold A2 for child photographing mode (A1>A2). When a fast-moving photographing object that is registered in advance, such as a child or pet, is recognized in step 53, the mode is shifted to sensitivity increasing mode in an early stage by switching threshold A1 for normal photographing mode to threshold A2 for child photographing mode of a lower threshold.

Figure 18:
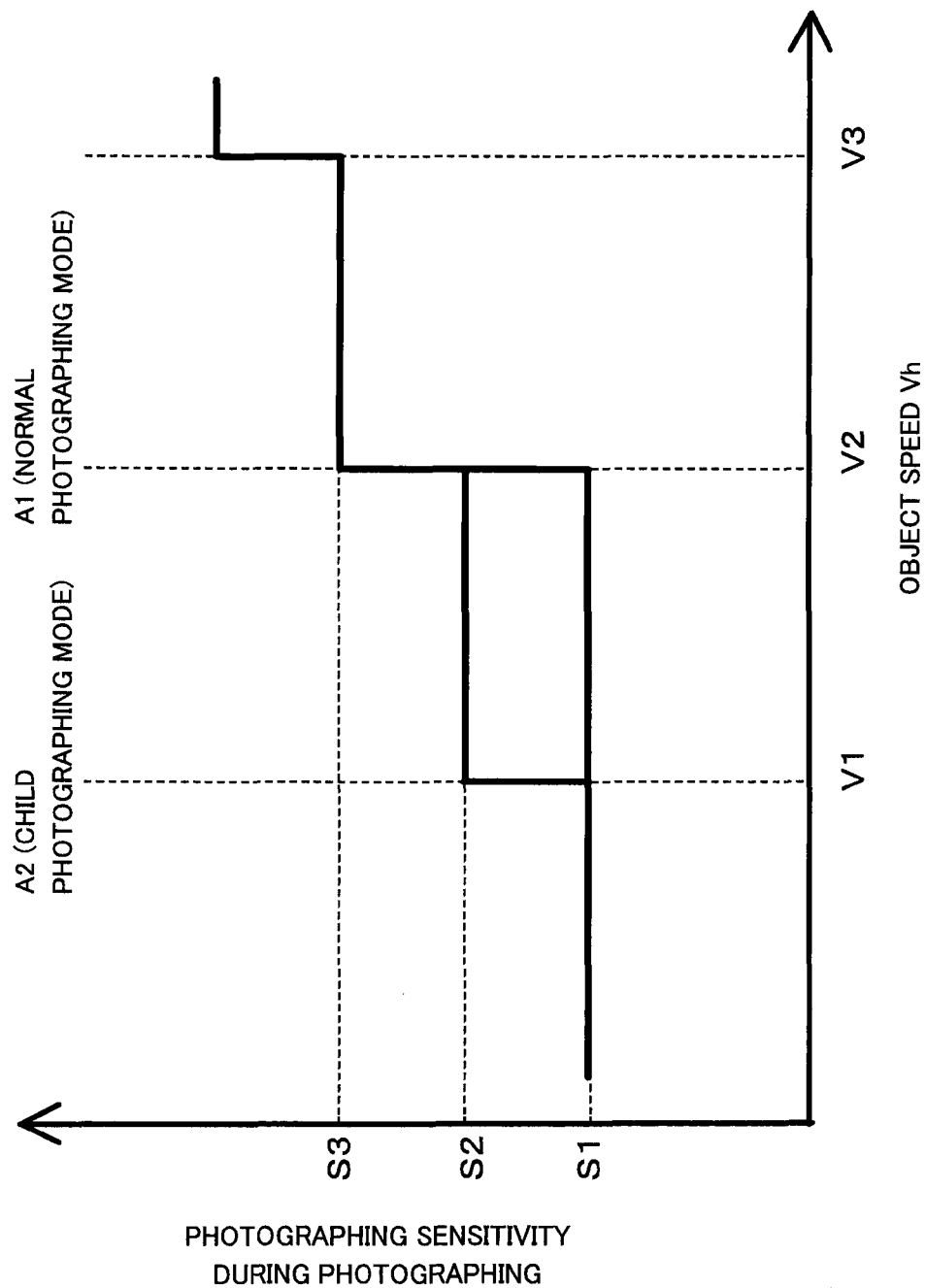
FIG. 18 illustrates change of the moving speed Vh of the photographing object and photographing sensitivity S upon photographing according to threshold A by the imaging apparatus according to Embodiment 5.

FIG. 18 illustrates the switching of the moving speed Vh of the photographing object and the photographing sensitivity S during photographing based on threshold A. Threshold A has the following two kinds.

(1) In normal photographing mode (threshold A1), if the speed of the photographing object exceeds V2, sensitivity is increased gradually according to the speed of the photographing object.

(2) In child photographing mode (threshold A2), when the speed of the photographing object exceeds V1, sensitivity is increased gradually according to the speed of the photographing object.

These two modes can be selected by the photographer using a menu button of digital camera 1, but, in "sensitivity increasing & camera shake correction automatic selecting mode," if the photographing object is an object whose motion is difficult to predict, the threshold A1 for normal photographing mode can be changed to the threshold A2 of child photographing mode of a lower threshold. In other words, when the threshold A1 for normal photographing mode is used, photographing sensitivity does not become the photographing sensitivity S3 until the speed of the photographing object reaches V2, whereas, when the threshold A2 for child photographing mode is used, photographing sensitivity becomes S2 at the photographing the speed of the photographing object V1 and photographing sensitivity becomes S3 at the speed of the photographing object V2.

In this way, when photographing a photographing object whose motion is difficult to predict such as a child, sensitivity is increased in an early stage assuming that the child will move around by lowering the threshold for shifting to sensitivity increasing mode, to minimize the influence of object shake even at the risk of sacrificing image quality.

Returning to the flow of FIG. 17, when the comparison result in step 56 shows that the moving speed Vh is equal to or higher than the threshold A, microcomputer 3 decides that the photographing object is moving at a speed that causes object shake, and moves the process to step 61. When the moving speed Vh is lower than the threshold A, microcomputer 3 decides that object shake does not occur, and moves the process to step 57. In the situation where object shake does not occur, ISO sensitivity, which is photographing sensitivity, is set to 100 or equivalent and the shutter speed is set to 1/30 second.

In step 57, microcomputer 3 continues "camera shake correcting mode" as the photographing mode and starts camera shake correcting section 16 and camera shake correcting mechanism 20. Camera shake correcting section 16 detects camera shake occurring on the camera through angular velocity sensors 18x and 18y. According to command from microcomputer 3, a current is supplied to coils 24x and 24y of pitching move frame 21 from an external circuit and the magnetic circuit comprised of actuators 27x and 27y makes pitching move frame 21 and the correction lens group L2 move in two directions X and Y in the plane perpendicular to the optical axis AX. In this case, light receiving element 31 detects the position of pitching move frame 21, thereby enabling position detection with high accuracy.

If, in step 58, microcomputer 3 recognizes the full-press operation in shutter operation section 36 by the photographer, microcomputer 3 performs photographing processing in step 59. That is, in step 59, a photographing object image is formed in imaging sensor 4, an image signal is outputted, and the outputted image signal is displayed on display section 55.

In step 60, microcomputer 3 records the image signal in image recording section 12 and finishes the photographing processing. Furthermore, when the image signal is recorded, the position of the AF area with respect to the whole of the photographed image, is also recorded.

In this way, when the moving speed Vh of the photographing object is lower than the threshold A, photographing sensitivity is not changed and the camera shake correcting function is started. This reduces camera shake and allows an image of high quality to be taken.

On the other hand, when the moving speed Vh is equal to or higher than the threshold A in step 56 above, microcomputer 3 changes the photographing mode to "sensitivity increasing mode." That is, digital signal gain setting section 111 sets gain so as to achieve high photographing sensitivity. If, in step 62, the full-press operation in the shutter operation section by the photographer, photographing processing is carried out in step 63. That is, an optical image of the photographing object is formed in imaging sensor 4 and imaging sensor 4 outputs the image signal. Digital signal amplification section 110 then amplifies the image signal outputted from digital signal processing section 8 at the gain set in step 60. In step 64, the amplified image signal is recorded in image recording section 12, and the photographing processing is finished. Furthermore, when the image signal is recorded, the position of the AF area with respect to the whole of the photographed image, is also recorded. Photographing is not limited to a single shot alone and continuous shooting may be performed as well.

In this way, when the photographing object is a child, high photographing sensitivity is automatically set assuming that the photographing object is likely to move. By this means, exposure time can be made shorter and a photograph can be taken at a high shutter speed, so that object shake can be prevented. Incidentally, in "sensitivity increasing mode," the camera shake correcting mechanism may or may not be operated.

Here, the present embodiment sets the photographing mode to "camera shake correcting mode" before the "half-press shutter operation" in step 52 above. If the photographing mode is set to "camera shake correcting mode," camera shake correction is performed in "half-press shutter operation" as well. Here, when the motion of the face of the photographing object is detected, since camera shake is corrected, the motion can be detected in a state of reduced influence of camera shake, so that the accuracy of motion detection can be improved. That is, it is possible to decide whether the motion of the image in imaging sensor 4 is caused by the motion of the photographing object or is influenced by the motion of the camera caused by camera shake by the photographer.

As described above, according to the present embodiment, the object speed is calculated based on the detected motion of the photographing object, whether or not the object speed is equal to or higher than a threshold A is decided, and, if the object speed is lower than the threshold A and a specific photographing object whose motion is difficult to predict such as a child or pet is detected, the threshold for shifting to sensitivity increasing mode is lowered compared to when no photographing object such as a child or pet is detected, thereby shifting the mode to sensitivity increasing mode in an early stage and making exposure time shorter by increasing ISO sensitivity and increasing the shutter speed, so that it is possible to reduce image quality degradation due to camera shake or object shake and easily take a photograph in good image quality. This makes it possible to switch the camera shake correcting function and the photographing sensitivity changing function upon photographing objects whose motion is difficult to predict other than children or pets, such as adults.

In particular, the present embodiment has two values of a threshold A1 for normal photographing mode and a threshold A2 for child photographing mode (A1>A2), using threshold A2 when the photographing object is a fast-moving photographing object such as a child or pet and using the threshold A1 for other photographing objects, so that, when the photographing object is a fast-moving photographing object such as a child or pet, ISO sensitivity can be increased faster than for other photographing objects to increase the shutter speed, and, consequently, images can be photographed faster without object shake.

Incidentally, with the present embodiment, the threshold A2 for child photographing mode may be set to 0. Furthermore, when a specific photographing object whose motion is difficult to predict such as a child or pet is detected, the mode may be shifted to sensitivity increasing mode irrespective of the speed of the photographing object (step 61).

Furthermore, if the calculated object speed is lower than a threshold and a specific photographing object is detected, photographing may be performed at a higher amplification factor of image signal than when the specific photographing object is not detected.

Here, the relationship between the change of speed of the photographing object and photographing sensitivity from "half-press shutter operation" to "full-press shutter operation," up to photographing, will be explained.

Figure 19:
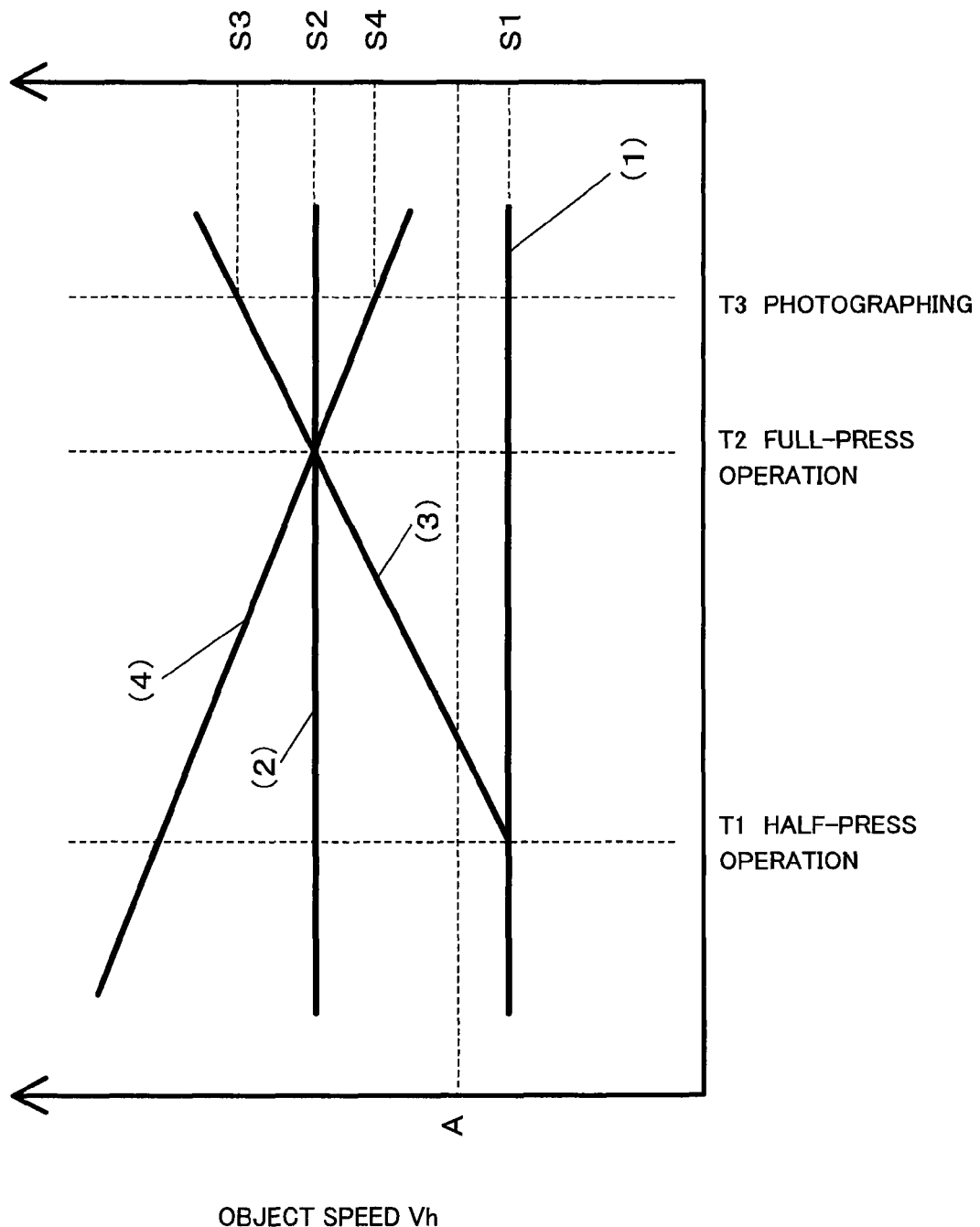
FIG. 19 illustrates the relationship between the moving speed Vh of the photographing object of the imaging apparatus and photographing sensitivity S upon photographing according to Embodiment 5.

FIG. 19 illustrates the relationship between the moving speed Vh of the photographing object and the photographing sensitivity S upon photographing. In FIG. 19, T1 is the half-press operation, T2 is the full-press operation and T3 is the time a photograph is taken. Furthermore, S1 to S4 represent photographing sensitivity upon photographing, and A represents a threshold. If the object speed Vh is decided to be equal to or higher than the threshold A and the object speed is lower than the threshold A, the speed of camera shake correcting section 16 is increased, and, if the object speed is equal to or higher than the threshold A, ISO sensitivity is increased and the shutter speed is increased. Although the present embodiment utilizes two values of a threshold A1 for normal photographing mode and a threshold A2 for child photographing mode (A1>A2), the present embodiment will be explained here as "threshold A."

The present embodiment starts motion vector detection with the "half-press shutter operation" (step 53 of the flowchart in FIG. 17). Motion vector detection is performed at regular intervals until immediately before the "full-press shutter operation" (steps 56 and 60 in the flowchart of FIG. 17) and the speed of the photographing object at the time of the "full-press shutter operation" is assumed to the definitive speed of the photographing object Vh. In this case, in FIG. 19, (1) shows a case where the photographing object does not move, (2) shows a case where the photographing object is moving at a constant speed, (3) shows a case where the photographing object is accelerating at a predetermined rate and (4) shows a case where the photographing object is decelerating at a predetermined rate. The relationships between speed change with the photographing object and the photographing sensitivity upon the first shot will be described as follows.

(1) When the object speed Vh during the "half-press shutter operation" is lower than the threshold A and is constant, the object speed vh is lower than the threshold A, and, consequently, photographing sensitivity is not increased and photographing sensitivity S1 for normal photographing mode is adopted.

(2) When the object speed Vh during the "half-press shutter operation" is higher than the threshold A and is constant, photographing sensitivity is increased according to the object speed Vh during the "full-press shutter operation." In this case, photographing sensitivity is se to S2.

(3) When the object speed Vh during the "half-press shutter operation" exceeds the threshold A and increases gradually, since the object speed Vh increases gradually, the acceleration is calculated and sensitivity is set to photographing sensitivity S3 (S2<S3) by predicting the speed increase in the time lag between the "full-press shutter operation" and photographing. Furthermore, when the second or later photographs are taken consecutively at this time, the photographing sensitivity and the shutter speed are preferably increased every shot.

(4) When the object speed Vh during the "half-press shutter operation" exceeds the threshold A and slows down gradually, contrary to the above case (3), when the object speed Vh slows down gradually, sensitivity is set to photographing sensitivity S4 (S4<S2) by predicting the decrease of speed. Furthermore, when the second and subsequent photographs are taken consecutively at this time, it is preferable to decrease the photographing sensitivity and the shutter speed every shot.

The above described explanations are illustrations of preferred embodiments of the present invention and the present invention is by no means limited to these.

The present invention is applicable to any electronic apparatus which having imaging apparatus. For example, the present invention is applicable not only to digital cameras and video cameras but is also applicable to information processing apparatus such as cellular phones with a camera, portable information terminal such as personal digital assistants (PDA's), and personal computers with imaging apparatus.

Furthermore, the configuration of the imaging optical system and the camera shake correcting section of the above embodiments are not limited to the examples described herein. For example, the camera shake correcting section may drive the imaging sensor in two directions perpendicular to the optical axis with respect to the imaging optical system. Furthermore, for example, the camera shake correcting section may change the angle of the prism mounted in the front in the photographing object side of the lens barrel or may drive the whole of the lens barrel, and the configuration is not limited to these configurations as long as camera shake can be corrected. Furthermore, it is also possible to electronic camera shake correction schemes of correcting camera shake by changing positions for sampling image in the imaging sensor or taking a plurality of photographs of the same photographing object at short shutter speed and combining these photographs into one image. Obviously, the scheme is not limited to these or to the examples described herein.

Furthermore, although a case has been described with the above embodiments where the moving speed of the photographing object is calculated using a motion vector, the present invention is not limited to this and the moving speed of the photographing object may be detected using an external sensor separately (e.g., distance measuring section 45 in FIG. 1).

Furthermore, although cases have been described with the above-described embodiments where exposure time to the imaging sensor is controlled by operating the shutter, the present invention is not limited to this, and exposure time to the imaging sensor may be controlled using an electronic shutter or the like. Furthermore, although a case has been described above with the present embodiment where a plurality of photographs can be taken consecutively by operating the shutter operation section once, it is also possible to adopt a system whereby it is possible to take a picture only while the shutter operation section is operated (pressed).

Furthermore, although cases have been described above with the embodiments where AF areas are set by detecting a face, but a system may be employed as well whereby the AF area may be set by detecting specific colors.

Furthermore, although the digital camera according to the present embodiment has an imaging optical system, the present invention is not limited to this. As in the case of a single-lens reflex camera system, the present invention is also applicable to imaging apparatus where a lens barrel that holds an imaging optical system and a camera including an imaging sensor are used separately. For example, the present invention is applicable to the whole of a system where a lens barrel that holds an imaging optical system and a camera are provided separately and the photographer can use the lens barrel and the camera in combination.

In the case of the single-lens reflex camera system, the value of the aforementioned threshold at which object shake occurs may be made settable as follows. When, for example, a photograph is taken with a standard replacement lens having a focal length of 100 mm or less on a 35 mm basis mounted, the influence of camera shake is less. On the other hand, when a photograph is taken with a telephoto replacement lens exceeding 300 mm, the influence of camera shake is significant. Therefore, the threshold may be changed according to the focal length of the replacement lens used. In this case, the threshold may be increased when a standard replacement lens of 100 mm or less is used and the threshold may be decreased when a telephoto lens exceeding 300 mm is used. Furthermore, as for the focal length of the replacement lens, the camera may be made to read focal length information of the lens when the replacement lens is mounted in the camera so as to be able to automatically set a threshold. Alternatively, the photographer may set the threshold manually.

Furthermore, although with the herein-contained embodiments the term "imaging apparatus" is used for ease of explanation, other terms including "photographing apparatus," "digital camera" and "imaging method" may be used as well.

Moreover, the components configuring the above-described digital camera, for example, the type of the imaging optical system, the drive section and the mounting method, and moreover the type of the detecting section or the like are not limited to the embodiments described herein.

Furthermore, the imaging apparatus explained above can also be implemented by a program for making the photographing control method for this imaging apparatus function. This program is stored in a computer-readable record media.

As described above, the present invention can provide an imaging apparatus capable of preventing photographing sensitivity from being increased more than necessary, reducing image quality degradation due to camera shake or object shake and easily photographing images in good image quality.

The imaging apparatus according to the present invention is suitable for use in a digital still cameras and digital video cameras where image in good image quality is required, cellular phones having a camera section and PDA's.

What is claimed is:

1. An imaging apparatus comprising:
an imaging optical system that forms an optical image of a photographing object;
an imaging sensor that receives the formed optical image, converts the optical image to an electrical image signal and outputs the image signal;
a specific photographing object detection section that detects, before a photograph is taken, based on a physical attribute of the photographing object represented by the image signal, whether or not the photographing object is a specific photographing object; and
a control section that establishes a first amplification factor based on the physical attribute of the photographic object when the photographing object is determined to be the specific photographing object, and establishes, based on the physical attribute of the photographic object, a second amplification factor of the image signal that is higher than the first amplification factor and in an exposure time that is shorter as compared with when the photographing object is detected not to be the specific photographing object.

2. The imaging apparatus according to claim 1, further comprising an object speed deciding section that measures a motion of the optical image of the photographing object at a predetermined time before the photograph is taken, and calculates an object speed of the photographing object,
wherein, when the calculated object speed is equal to or higher than a threshold that is greater than zero, the control section performs photographing at the higher amplification factor of the image signal and in the shorter exposure time.

3. The imaging apparatus according to claim 2, wherein, when the calculated object speed is lower than the threshold and the photographing object is detected to be the specific photographing object, the control section performs photographing at the higher amplification factor of the image signal and in the shorter exposure time compared with when the object speed is lower than the threshold and the photographing object is detected not to be the specific photographing object.

4. The imaging apparatus according to claim 1, wherein the specific photographing object is a child, pet or animal.

5. The imaging apparatus according to claim 1, wherein:
the specific photographing object detection section detects a face of the specific photographing object; and
when the face of the specific photographing object is detected, the control section performs photographing at the higher amplification factor of the image signal and in the shorter exposure time.

6. The imaging apparatus according to claim 1, wherein:
the specific photographing object detection section detects that the specific photographing object is a child; and
when the specific photographing object is detected to be the child, the control section performs photographing at the higher amplification factor of the image signal and in the shorter exposure time.

7. The imaging apparatus according to claim 1, wherein:
the specific photographing object detection section detects that the specific photographing object includes a child and an adult; and
when the specific photographing object is detected to be only the child, the control section performs photographing at the higher amplification factor of the image signal and in the shorter exposure time.

8. An imaging apparatus body used in combination with a lens barrel mounted with a camera shake correcting section that corrects shake of an optical image caused by motion of the imaging apparatus body, the imaging apparatus body comprising:
an imaging sensor that receives a formed optical image of a photographing object, converts the optical image to an electrical image signal and outputs the image signal;
a specific photographing object detection section that detects, before a photograph is taken, and based on a physical attribute of the photographing object represented by the image signal, whether or not the photographing object is a specific photographing object; and
a control section that establishes a first amplification factor based on the physical attribute of the photographic object when the photographing object is determined to be the specific photographing object, and establishes, based on the physical attribute of the photographic object, a second amplification factor of the image signal that is higher than the first amplification factor and in an exposure time that is shorter as compared with when the photographing object is detected not to be the specific photographing object.

9. A lens barrel used in combination with an imaging apparatus body, the imaging apparatus body comprising:
an imaging sensor that receives a formed optical image of a photographing object, converts the optical image to an electrical image signal and outputs the image signal;
a specific photographing object detection section that detects, before a photograph is taken, based on a physical attribute of the photographing object represented by the image signal, whether or not the photographing object is a specific photographing object; and
a control section that establishes a first amplification factor based on the physical attribute of the photographic object when the photographing object is determined to be the specific photographing object, and establishes, based on the physical attribute of the photographic object, a second amplification factor of the image signal that is higher than the first amplification factor and in an exposure time that is shorter as compared with when the photographing object is detected not to be the specific photographing object,
the lens barrel comprising:
an imaging optical system that forms the optical image of the photographing object; and a camera shake correcting section that corrects shake of the optical image caused by motion of the imaging apparatus body.

10. The imaging apparatus according to claim 1, wherein the specific photographing object is more likely to move than an other photographing object.

11. The imaging apparatus according to claim 1, wherein the specific photographing object moves faster than an other photographing object.

12. The imaging apparatus according to claim 2, wherein the control section performs photographing by increasing the amplification factor of the image signal and shortening exposure time according to the speed of the photographing object, when the photographing object is detected to be the specific photographing object and the calculated photographing object speed is higher than a predetermined first threshold, or performs photographing by increasing the amplification factor of the image signal and shortening exposure time according to the speed of the photographing object, when the photographing object is detected not to be the specific photographing object and the calculated photographing object speed is higher than a predetermined second threshold that is higher than the first threshold.

13. The imaging apparatus according to claim 1, wherein the specific photographic object detection section detects, before the photograph is taken, whether or not another photographic object represented by the image signal is the specific photographing object, and the control section establishes the second amplification factor when one of the photographic object and the another photographic object is determined to be the specific photographic object.

* * * * *